(12) United States Patent
Rufer et al.

(10) Patent No.: US 8,378,521 B2
(45) Date of Patent: Feb. 19, 2013

(54) ENERGY STORAGE SYSTEMS

(75) Inventors: Alfred Rufer, Villars-sous-Yens (CH);
Daniel Favrat, Epalinges (CH);
Philippe Barrade, Chavannes-Renens (CH); Sylvain Lemofouet, Romanel-sur-Lausanne (CH)

(73) Assignee: Ecole Polytechnique Federale de Lausanna (EPFL), Lausanne (CH)

( * ) Notice: Subject to any disclaimer, the term of this patent is extended or adjusted under 35 U.S.C. 154(b) by 625 days.

(21) Appl. No.: 12/598,618

(22) PCT Filed: May 9, 2007

(86) PCT No.: PCT/IB2007/051736
§ 371 (c)(1),
(2), (4) Date: Nov. 3, 2009

(87) PCT Pub. No.: WO2008/139267
PCT Pub. Date: Nov. 20, 2008

(65) Prior Publication Data
US 2010/0133903 A1    Jun. 3, 2010

(51) Int. Cl.
*H02J 7/00*    (2006.01)
*H02J 9/00*    (2006.01)
*H02J 7/34*    (2006.01)
*H02J 1/10*    (2006.01)

(52) U.S. Cl. ............. 307/51; 307/65; 320/101; 320/124
(58) Field of Classification Search .................... 307/51, 307/65; 320/101, 124
See application file for complete search history.

(56) References Cited

U.S. PATENT DOCUMENTS
(Continued)

FOREIGN PATENT DOCUMENTS
CN    1412443    4/2003
EP    0196690    10/1986
(Continued)

OTHER PUBLICATIONS

S. Lemofouet, Investigations and optimization of hybrid electricity storage systems based on compressed air and supercapacitors, Thesis Nmbr. 3628, EPFL, CH 1015 Lausanne—267 pgs, 2006.

(Continued)

*Primary Examiner* — Rexford Barnie
*Assistant Examiner* — Dru Parries
(74) *Attorney, Agent, or Firm* — Sturm & Fix LLP

(57) ABSTRACT

Different types of energy storage systems are described, in particular hydro-pneumatic storage systems. In one, energy is stored by compressing gas in a chamber (44,45,54,55) with a liquid piston and released by gas expansion. A spray head or grid at the top of the chamber (44,45,54,55) supplies liquid as a shower through the gas being compressed or expanding in the cylinder (11,12) to maintain an isothermal condition. In another, energy is stored from an array of solar cells connected to an array of supercapacitors forming an auxiliary storage, and a main energy storage device such as a hydro-pneumatic storage system, for supply to an AC or DC network. The efficiency is improved by connecting the solar cells via the array of supercapacitors to the AC or DC network. An immersed hydro-pneumatic storage device for off-shore/on-shore power generation systems comprises a cylinder that is immersed in a liquid mass, wherein energy is stored by compressing gas with a liquid piston and energy is released by gas expansion. The mass of liquid maintains an isothermal condition in the cylinder during compression and expansion.

10 Claims, 19 Drawing Sheets

U.S. PATENT DOCUMENTS

| | | | |
|---|---|---|---|
| 3,996,741 | A | 12/1976 | Herberg |
| 4,370,559 | A | 1/1983 | Langley |
| 6,762,926 | B1 | 7/2004 | Shiue |
| 7,000,395 | B2 * | 2/2006 | Wai et al. .................. 60/698 |

FOREIGN PATENT DOCUMENTS

| | | |
|---|---|---|
| JP | 2000166128 | 6/2000 |
| WO | 9306367 | 4/1993 |
| WO | 9701029 | 1/1997 |

OTHER PUBLICATIONS

P. Barrade, A. Ruler, Current capability and power density of supercapacitors: considerations on energy efficiency, EPE 2003: European Conference on Power Electronics and Applications, Sep. 2-4, Toulouse, France—10 pgs.

D.P. Hohm, M.E. Ropp, Comparative study of maximum power point tracking algorithms, Progress in photovoltaïcs : research and applications, Prog. Photovolt.: Res. Appl. 2003; 11:47-2 (DOI:10.1002/pip.459), Published by John Wiley & Sons, Ltd.—16 pgs.

Van der Linden Septimus, EESAT 02 Conference on Electrical Energy Applications and Technologies, San Francisco, Apr. 2002—6 pgs.

A. Reller, I. Cyphelly; Speicherung gasförmiger energienträger: Eine Bestandsaufnahme, VDE—Berichte 1734, Energiespeicher, p.p. 37-45.—5 pgs, 2002.

Kentschke T., Druckluftmaschinen als Generatorantrieb in Warmluftspeichersystemen, PhD Dissertation, 2004, Technical University Clausthal, Germany.

* cited by examiner

Compression, right-to-left

Compression, left-to-right

"fill-before-expansion", left-to-right

Expansion, left-to-right

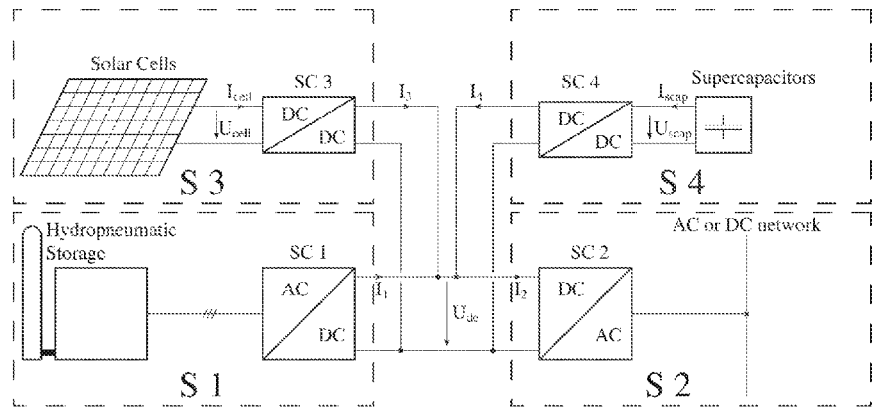

Fig. 2-1

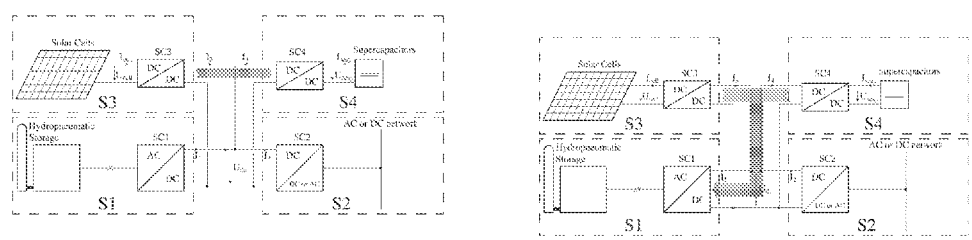

Sequence 1: Energy from the solar cells is injected into the supercapacitive tank.

SC3: MPPT

SC4: regulation of the DC link voltage $U_{dc}$

Sequence 2: The energy initially stored into the supercapacitors and the energy produced by the solar cells are simultaneously injected into the hydropneumatic accumulator.

SC1: MEPT

SC3: MPPT

SC4: regulation of the DC link voltage $U_{dc}$

Fig. 2-2

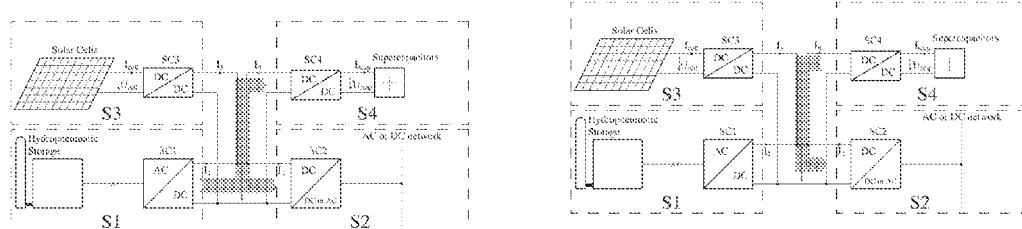

Sequence 3: Part of the energy stored into the hydropneumatic accumulator is injected simultaneously into the supercapacitive accumulator and into the network

SC1: MEPT

SC2: feed the network

SC4: regulation of the DC link voltage $U_{dc}$

Sequence 4: Direct energy transfer from the supercapacitors to the network

SC2: feed the network

SC4: regulation of the DC link voltage $U_{dc}$

Fig. 2-3

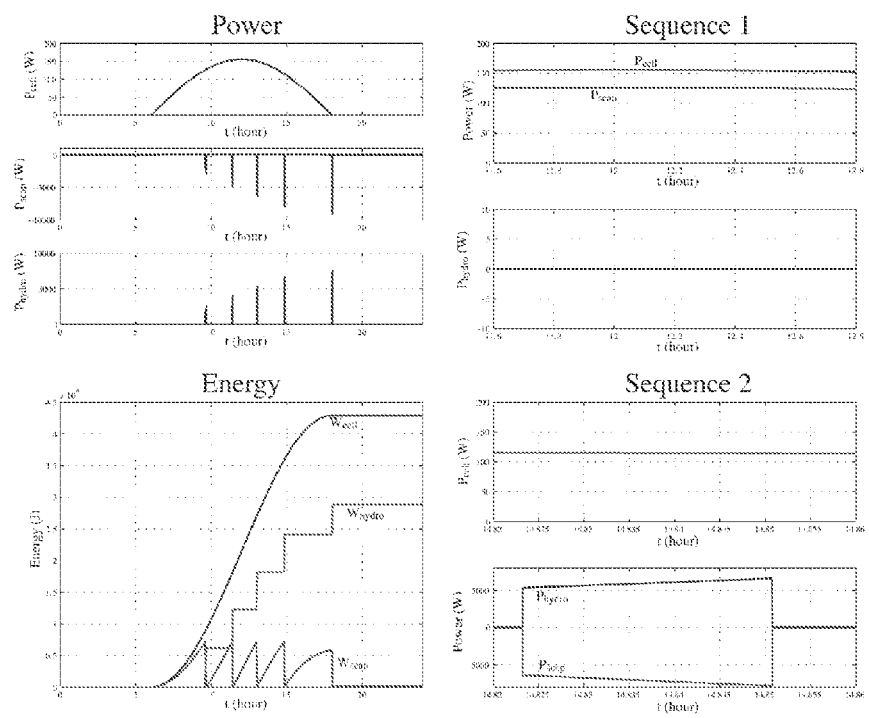

Fig. 2-4

Sequence 1: Energy from the solar cells is injected directly into the supercapacitive tank.

All the converters are disabled

Sequence 2: Energy transfer from the solar cells and supercapacitors to the hydropneumatic accumulator.

SC1: MEPT

SC3: regulation of the DC link voltage $U_{dc}$

Sequence 3: Energy from the hydropneumatic accumulator is injected to the supercapacitive tank and the network.

SC1: MEPT

SC2: control of voltage/current on the network

SC3: regulation of $U_{dc}$

Sequence 4: Energy transfer from the supercapacitors t network.

SC2: control of voltage/current on the network

SC3: regulation of $U_{dc}$

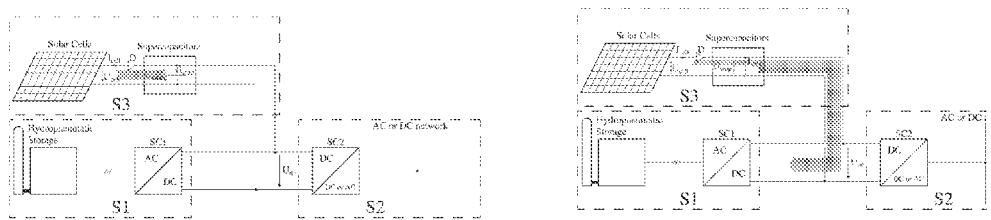

Sequence 1: Energy from the solar cells is injected directly into the supercapacitive tank.

All the converters are disabled

Sequence 2: Energy transfer from the solar cells and supercapacitors to the hydro-pneumatic accumulator.

SC1: MEPT

Fig. 2-9

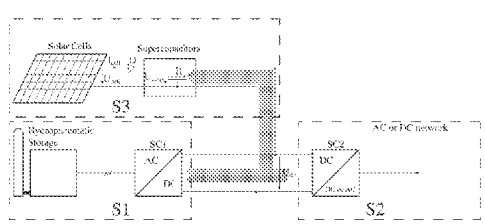 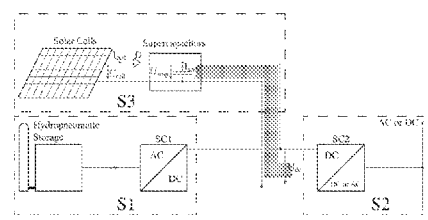

Sequence 3: Energy from the hydro-pneumatic accumulator is injected to the supercapacitive tank and the network.

SC1: MEPT

SC2: control of voltage/current on the network

Sequence 4: Energy transfer from the supercapacitors to network.

SC2: control of voltage/current on the network

Fig. 2-10

ENERGY STORAGE SYSTEMS

FIELD OF THE INVENTION

This invention relates to energy storage systems particularly in the context of distributed and intermittent renewable energy sources such as solar and wind.

BACKGROUND OF THE INVENTION

The increasing recourse to renewable energy sources such as solar and wind has led to a need to store the produced energy. For this, hydro-pneumatic storage systems have been developed wherein energy is stored by compressing a gas and is released by gas expansion.

In order to provide good power quality and flexibility to these storage systems, it has been proposed to associate a main storage system (in particular a hydro-pneumatic storage system) with an auxiliary, supercapacitive storage system. Power variation is achieved by intermittent operation of the main storage system and use of the supercapacitive storage system to smooth the resulting power, through the regulation of a common DC bus voltage. Such hybrid storage systems are compatible with a wide range of load and source powers, thanks to the obtained power flexibility.

A cost comparison shows that in addition to its environmental advantages, hydro-pneumatic storage is cost-effective compared to lead acid battery storage. However, further improvements in efficiency are needed.

Theoretical considerations make it desirable to compress and expand the gas under approximately isothermal conditions, but this is not easy to achieve in practice.

A dedicated energy storage solution is also needed to enhance offshore and onshore electric power generation systems, fed by renewable energy sources, such as wind and solar sources.

SUMMARY OF THE INVENTION

A first main inventive aspect is a hydro-pneumatic storage device wherein energy is stored by compressing gas in an upright expansion/compression chamber with a liquid piston and energy is released by gas expansion acting on the liquid piston, and the storage device comprises a spray head or grid at the top of the expansion/compression chamber for supplying liquid as a shower through the gas being compressed or expanding in the chamber to maintain an essentially isothermal condition.

A second main inventive aspect is an energy storage device wherein energy from an array of solar cells is storable in a main storage, in particular a hydro-pneumatic storage or any other main energy storage means such as a battery or a flywheel, and in an auxiliary storage comprising an array of supercapacitors, wherein the main and auxiliary storages are alternately operable in first and second charging sequences, wherein in the first charging sequence the main storage is disconnected from the solar cells and the array of supercapacitors is charged from the array of solar cells, and in the second charging sequence the main storage is connected to be charged by the array of solar cells while the array of supercapacitors discharges, the main storage and auxiliary storages being connectable to an AC or DC network. This energy storage device is characterized in that the array of solar cells is connected via the array of supercapacitors to the AC or DC network.

A third main inventive aspect is an immersed hydro-pneumatic storage device, especially for smoothing or leveling fluctuating power from windmills and photovoltaic cells in off-shore/on-shore power generation systems, that comprises a cylinder that is immersed in a liquid mass, wherein energy is stored by compressing gas in the cylinder with a liquid piston and energy is released by gas expansion acting on the liquid piston, and wherein the mass of liquid in which the cylinder is immersed maintains an essentially isothermal condition in the cylinder during compression and expansion of the gas.

Further features of the invention are set out in the following description, drawings and claims

BRIEF DESCRIPTION OF DRAWINGS

The different aspects of the invention will now be described, by way of example, with reference to the accompanying drawings in which:

FIGS. 1-1 to FIG. 1-6 pertain to a first inventive aspect, wherein

FIG. 1-1 is a diagram of an embodiment of a compression-expansion system according to the first inventive aspect;

FIG. 1-2 is a diagram of a modified part of this compression-expansion system;

FIG. 1-3 is a diagram corresponding to FIG. 1-1 illustrating the compression phase, with movement of the horizontal equipment from the right to the left;

FIG. 1-4 is a diagram corresponding to FIG. 1-1 illustrating the compression phase, with movement of the horizontal equipment from the left to the right;

FIG. 1-5 is a diagram corresponding to FIG. 1-1 illustrating the filling phase, with movement of the horizontal equipment from the left to the right;

FIG. 1-6 is a diagram corresponding to FIG. 1-1 illustrating the expansion phase, with movement of the horizontal equipment from the left to the right;

FIGS. 2-1 to FIG. 2-18 pertain to a second inventive aspect, wherein

FIG. 2-1 illustrates a known arrangement of four static converters for a hydro-pneumatic accumulator;

FIG. 2-2 illustrates the charge mode of FIG. 2-1 (sequences 1 and 2);

FIG. 2-3 illustrates the discharge mode of FIG. 2-1 (sequences 3 and 4);

FIG. 2-4 illustrates the charge mode, power and energy balance with a zoom of sequences 1 and 2;

FIG. 2-5 illustrates an embodiment of the invention with three static converters only;

FIG. 2-6 illustrates the charge mode of FIG. 2-5 (sequences 1 and 2)

FIG. 2-7 illustrates the discharge mode of FIG. 2-5 (sequences 3 and 4);

FIG. 2-8 illustrates another embodiment of the invention with solar cells and supercapacitors in parallel with the DC bus;

FIG. 2-9 illustrates the charge mode of FIG. 2-8 (sequences 1 and 2);

FIG. 2-10 illustrates the discharge mode of FIG. 2-8 (sequences 3 and 4);

FIG. 2-11 is a graph illustrating the power needs of the hydro-pneumatic accumulator;

FIG. 2-12 are graphs illustrating the sizing of the supercapacitive tank;

FIG. 2-13 are graphs showing characteristics of solar cells;

FIG. 2-14 are graphs illustrating MPPT for the solar cells with a direct connection of supercapacitors;

FIG. 2-15 illustrates the charge mode, power and energy balance with a zoom of sequences 1 and 2 for the embodiment of FIG. 2-5;

FIG. 2-16 shows the power and energy effectively extracted for the embodiment of FIG. 2-5;

FIG. 2-17 illustrates the charge mode, power and energy balance with a zoom of sequences 1 and 2 for the embodiment of FIG. 2-8;

FIG. 2-18 shows the power and energy effectively extracted for the embodiment of FIG. 2-8;

FIGS. 3-1 to FIG. 3-7 pertain to a third inventive aspect, wherein

FIG. 3-1 illustrates the principle of BOP-A: a known closed gas cycle hydro-pneumatic storage system;

FIG. 3-2 illustrates the principle of BOP-B: a known open air cycle hydro-pneumatic storage system;

FIG. 3-3 is a diagram of a first embodiment of an immersed hydro-pneumatic storage system according to the invention, namely an electrically-interfaced IHPES system with oil-hydraulic machine;

FIG. 3-4 is a diagram illustrating the possible disposition of an electrically-interfaced IHPES system with water-hydraulic machine;

FIG. 3-5 is a diagram of a second embodiment of an immersed hydro-pneumatic storage system according to the invention, namely a mechanically-interfaced IHPES system with oil-hydraulic machine;

FIG. 3-6 is a diagram of another embodiment of an immersed hydro-pneumatic storage system according to the invention, namely a mechanically-interfaced IHPES system with water-hydraulic machine; and FIG. 3-7 is a diagram of another embodiment of an immersed hydro-pneumatic storage system according to the invention, namely a hydraulically-interfaced IHPES system for wind-hydraulic power generation.

DETAILED DESCRIPTION

Figure 1:
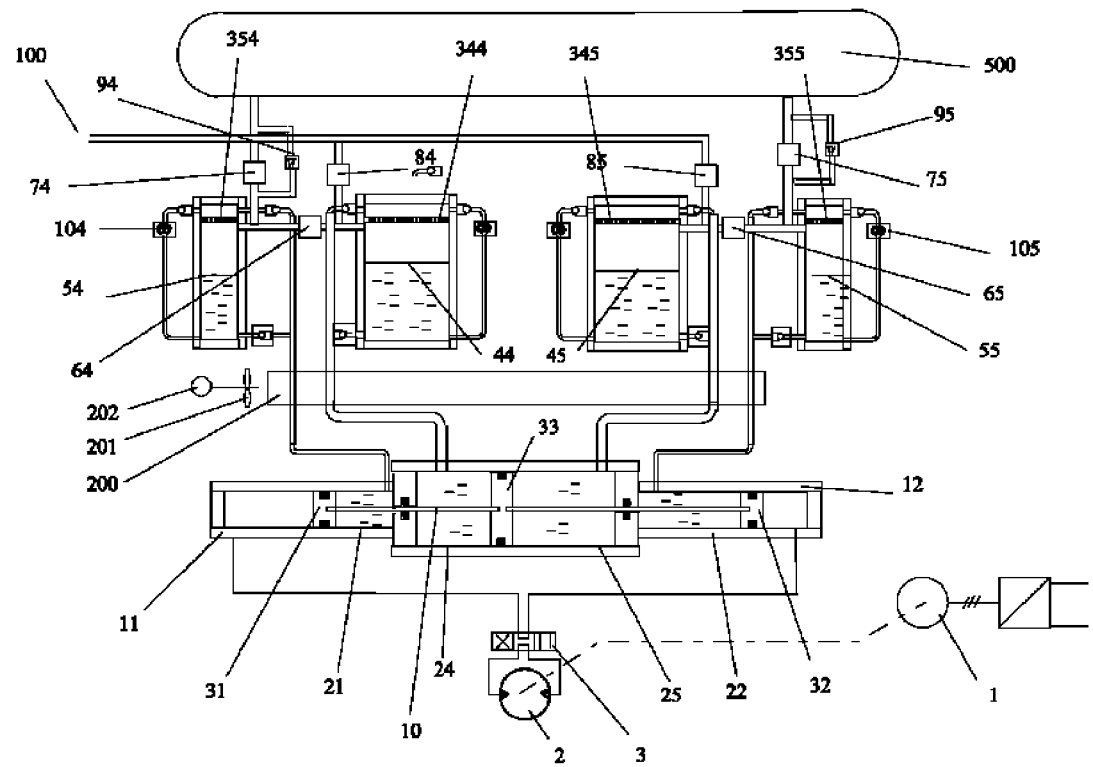

A list of the articles referred to in Sections 1, 2 and 3 of the detailed description is provided at the end of the description.

1. Compression/Expansion System for an Energy Storage System

A hybrid energy storage system has been described in [1] and [2], preferably used in the context of storing electrical energy produced from renewable sources as photovoltaic panels or wind turbines.

The first main inventive aspect of the present invention relates to a compression/expansion apparatus used to convert electric energy in mechanical/thermal energy. The system is composed of an electric motor/generator coupled to a hydraulic pump/motor, from where the generated liquid pressure is injected in a cylinder system where the liquid pressure is transmitted to the air-compression chambers, where the air pressure is obtained from a so-called liquid piston principle.

Accumulating energy corresponds to the compression phase of the air, and the restoring energy corresponds to the expansion of the air. Compression or expansion of the air corresponds to a positive or negative flow of the hydraulic power, and correspond to motor or generator operation of the coupled electric machine. The hydro-pneumatic principle is chosen in order to get easily a high pressure, that is typical from hydraulic hydrostatic pumps, because the energy density of the system is dependent on the accumulation pressure. The chosen principle corresponds to an open air-cycle, which allows a higher energy density in comparison to classical hydraulic accumulators with closed gas cycle as described in [1].

The hybrid structure described in [1] associates a main element based on hydro-pneumatics, and an auxiliary storage device based on supercapacitors. These two components are used alternately in an on/off mode with pulse-width modulation, allowing both the operation at an optimised efficiency of the hydro-pneumatic converter (MEPT, Maximum Efficiency Point Tracking), and the variation of the mean value of the stored or recovered power. The variation of this mean value is needed as well at the side of the primary generator, as example the PV panels, as at the output side which is the user side.

The auxiliary storage device is used as a kind of power transformation stage, when it stores slowly the low power delivered by the photovoltaic generator, and restores this energy at a higher power level in order to energise the hydro-pneumatic element. This last element can only be operated within a good efficiency over a given speed, corresponding to a given power level.

The pulse-width operation of the system is also used in order to adapt the pressure dependent operation power of the hydro-pneumatic element (high pressure at the loaded state, low pressure at the unloaded state), for maintaining constant level of the mean value of the stored power.

As described in [1] and [2], the compression of the air must be done in isothermal conditions in order to keep the energy density at a higher level, in opposition to the adiabatic storage described in [3]. Isothermal compression allows to store the energy at stabilised temperature without compensation of thermal flow for longer storage time as described in [4]. In order to achieve a good round trip energy efficiency, the expansion mode must be done as the compression mode, this means in as isothermal as possible conditions.

In opposition to the system described in [2] where an immersed lamination is used to achieve the transfer of the compression—expansion heat from the air to the liquid, the present invention proposes the use of a shower type injection of the liquid into the compression chamber producing a falling multi-beam stream of liquid through the being-compressed air and cooling/heating it. Whereas the injection of the liquid from the top of the compression chamber is easy to realise for the compression mode, an additional circulation system is added in order to produce a similar shower effect when the liquid is extracted via the bottom of the liquid piston chamber in the expansion mode. This circulating system is activated only in the expansion mode in order to save auxiliary energy in the compression mode.

In order to achieve high compression—expansion ratios for the whole energy storage system (high pressure in the range of 200 or 300 bar in the air storage vessel versus atmospheric pressure) a two-stage system is proposed where a primary actuating hydraulic system is used to move a combined two stage coupled secondary hydraulic system where the liquids are transmitted to the compression-expansion chambers, and where these liquids operate as liquid pistons.

The global energy storage system is composed of the electro-hydraulic-pneumatic converter described in the present invention, and additionally of a supercapacitive auxiliary storage device, directly connected to the PV panels.

Description of the Electro-Hydro-Pneumatic Compression Expansion System

The Compression Mode

The compression—expansion system is represented in FIG. 1-1, where the primary actuating system is composed of the electric motor/generator (1) coupled to the hydraulic pump/motor (2). A controllable valve (3) allows to achieve a left-to right and right-to left movement of the driven equipment. This hydrostatic component moves the mobile multiple piston system (10), via the two hydraulic cylinders (11) and (12) placed at the left and right side of this equipment.

The cylinders (11) and (12) are moving the secondary cylinders (21) and (22) of the high pressure stage, as well as the two cylinders (24) and (25) of the low pressure stage. The primary cylinder (11) and secondary HP cylinder (21) use a common piston (31), and the primary cylinder (12) and secondary HP cylinder (22) use a common piston (32). The low-pressure cylinders LP (24) and (25) are activated via a common piston (33).

The air to be compressed is taken from the ambient through the air inlet (100) and is stored in the air vessel (500). The air compression—expansion occurs in the vertical cylinders by effect of liquid pistons. Two low-pressure liquid pistons are represented in the middle (44), (45) and two high-pressure liquid pistons (54), (55) are represented at both sides left and right.

The system operates in a 2-stroke principle, where LP and HP cylinder-pairs are operated alternately.

When the mobile horizontal cylinders are moved from the right to the left ($1^{st}$ stroke—see FIG. 1-3) the left LP cylinder (44) is filled with liquid by the top, and the air initially accumulated in it is transferred to the left HP cylinder (54) as a pre-compression task. During this stroke, the transfer valve (64) is open, while the HP exhaust valve (74) and inlet LP valve (84) are closed. The level of the liquid is decreasing in the HP cylinder (54) and simultaneously rising in the LP one (44). During this task, the resultant volume of the air changes from the higher volume of the liquid-empty LP chamber (44) to the lower volume of the liquid-empty HP chamber (54). The compression ratio is predefined by the ratio of the volumes of LP and HP liquid piston cylinders.

The principle of filling through the top of the vertical cylinders assures a nearly isothermal process, the compression heat being transferred from the compressed/expanded air to the liquid via the multiple beam of the shower effect achieved using the grids (344,345;354,355) at the top of the respective cylinder (44,45;54,55). After being transferred from the air to the liquid, the heat must be evacuated to the outer atmosphere via an additional heat exchanger system composed of the exchanger itself (200), a fan (201) driven by an electric motor (202).

During the same stroke ("right to left" movement of the horizontal pistons), the right-sided vertical cylinders (45), (55), are in the complementary mode functions. This means that the right LP cylinder (45) is filling with atmospheric pressure air because of the decreasing level of liquid, and the right HP cylinder (55) is in the HP compression mode due to the rising level of the liquid in it. Here, the liquid is transferred from the HP horizontal cylinder at the right side (22). The liquid transfer through the top side of (55) (shower effect) produces its liquid piston effect by level rise in this chamber, compressing the air up to the pressure level in the storage cylinder (500). The transfer of the compressed air is achieved through an anti-return valve (95) when the pressure conditions are fulfilled. The transfer valve (65) is closed, and the inlet LP valve (85) is open. The HP exhaust valve (75) is also closed. The filling/emptying ways of the liquid piston chambers must be equipped with the necessary anti-return valves as indicated in FIG. 1-1.

Figures 1, 2:
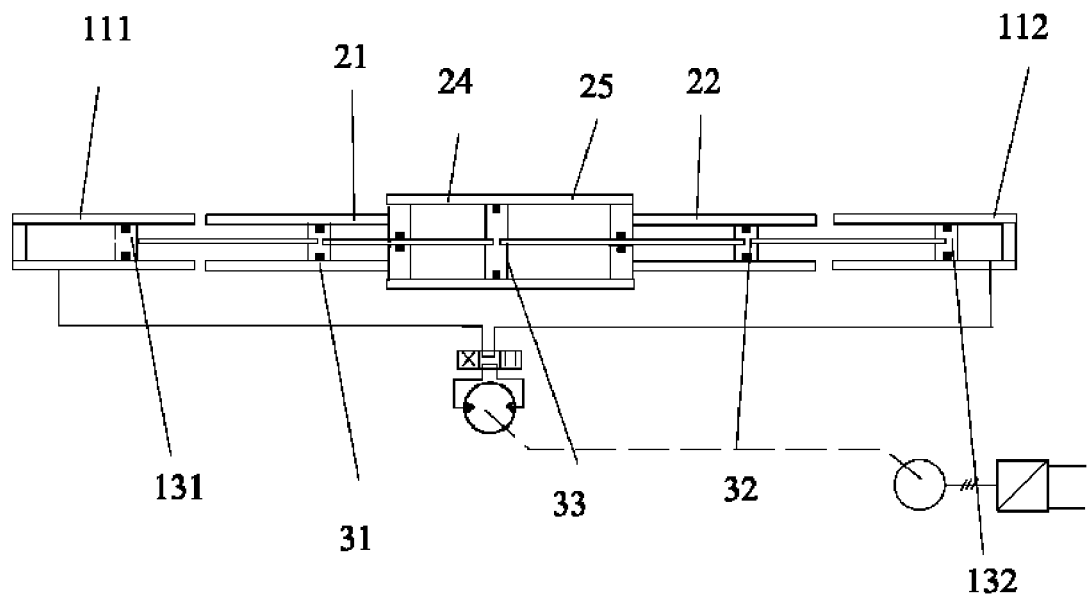

As represented in FIG. 1-1, the actuating cylinder system composed of the left and right cylinders (11) and (12) is integrated in the compression machine (common pistons (31) and (32)). A different version can be realized by separation of the actuating cylinders (11) and (12) from the secondary cylinders (21) and (22), and by coupling mechanically each actuating cylinders and secondary side HP cylinders. This leads to two additional pistons (131) and (132) that must be coupled with (31) and (32). A drawing of this system is represented in FIG. 1-2.

Because of the common pistons (31) and (32) for cylinder pairs (11)-(21), and (12)-(22), the liquid at both sides of the pistons could be different. As an example, water can be used as hydraulic liquid, also in the motor/pump (2). By using separated cylinders with mechanically coupled pistons, water can be used in the cylinders (21) and (22), and oil can be used in the additional cylinders (111) and (112) as well as in the motor/pump (2).

The second stroke is defined with a movement of the horizontal mobile equipment going from the left to the right, but with similar operation of the cylinders and compression chambers.

The Expansion Mode

The expansion mode is also defined with two strokes, corresponding to the displacements from right to left and from left to right of the horizontal moving equipment. Instead of having compression tasks inside of the vertical cylinders by liquid piston effects, the expansion mode is defined by decreasing the liquid levels in the chambers, producing the inverse effect of compression.

Because it is not possible to use the shower effect of the top filling using grids (344,345;354,355), the heat exchange assuming a more or less isothermal phenomenon must be activated separately by the use of additional circulation pumps (104) and (105), in order to produce a corresponding shower effect. For that, liquid is pumped from the bottom side of the vertical cylinders and is injected at the top through the shower grid (344,345;354,355).

In the expansion phase of the HP cylinders (54) and (55), a given quantity of high pressure air is injected in the cylinders, using a synchronised actuation of the actuating pistons and of the control valves (74) and 75), in order to avoid losses by air transfer in dead volumes. After the expansion in the HP cylinder (54) during the $1^{st}$ stroke of the expansion (movement from right to the left), the second stage (LP) expansion is occurring by transfer of the air mass from the expanded HP volume to the LP cylinder. The expansion occurs here because of the increasing of the liquid level in the HP cylinder and simultaneously the decrease of the level of the liquid in the LP cylinder. The resulting variation of the volume is due to the coupled LP and HP horizontal cylinders by their coupled pistons.

Figures 1, 2, 3:
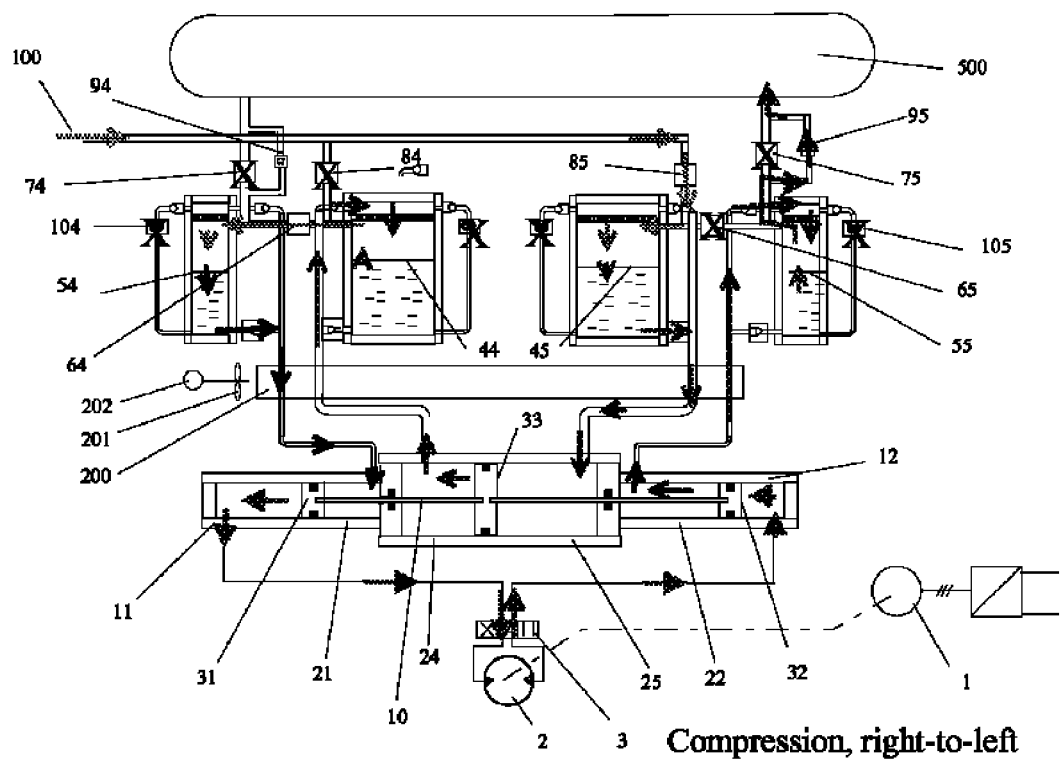

The above-described compression phase, with movement of the horizontal equipment from the right to the left is illustrated in FIG. 1-3 where the closed valves are illustrated as being over-written with an "X". Likewise, the compression phase, with movement of the horizontal equipment from the left to the right, is illustrated in FIG. 1-4; the filling phase, with movement of the horizontal equipment from the left to the right, is illustrated in FIG. 1-5 and the expansion phase, with movement of the horizontal equipment from the left to the right, is illustrated in FIG. 1-6.

2. Direct Connection of a Supercapacitive Tank on a Photovoltaic Panel without Power Electronics Interface MPPT with Sequential Energy Transfers to a Hydro-Pneumatic Storage System A second inventive aspect of the present invention pertains to a system dedicated to energy storage which allows energy storage from photovoltaic panels to a compressed air tank (or any other main energy storage device). To achieve this with a high efficiency, the air is compressed thanks to a hydro-pneumatic system, fed and controlled with a power converter that enables compression and expansion modes under Maximum Efficiency Point Tracking (MEPT). In order to extract from the solar cells the maximum of the energy they can produce, a Maximum Power Point Tracking (MPPT) power converter is connected to the solar cells. At least one intermediary storage tank made of supercapacitors and their associated power converter is inserted as a buffer, to adapt the power coming from the solar cells under MPPT condition to the power injected into the hydro-pneumatic system under MEPT condition. Energy fluxes from the solar cells to the hydro-pneumatic system are then sequential, via a supercapative tank. The analysis of such a sequential energy transfer shows that the number of power converters that are cascaded decreases the efficiency of the electrical energy transfer from one source to the other. In order to lower losses from the solar cells to the hydro-pneumatic storage system itself, the invention proposes two solutions that consist in reducing the number of power converters, and still keep the solar cells MPPT mode and the hydro-pneumatic storage system MEPT mode thanks to a supercapacitive tank. The general topologies, sizing criterion and control are presented. The efficiencies of the various solutions investigated here are compared to the maximal solution proposed in FIG. 2-1 where four systems are identified:

The system S1 is the hydropneumatic accumulator itself, fed by the static converter SC1. SC1 is controlled to enable charge and discharge processes along the maximum efficiency characteristics of the accumulator. Such a control is named Maximum Efficiency Point Tracking (MEPT).

The system S2 is the AC or DC network where energy is finally injected by the way of the static converter SC2.

The system S3 is related to solar panels, where the static converter SC3 must adapt voltage levels. SC3 must also ensure a Maximum Power Point Tracking (MPPT) on the solar cells.

The system S4 is added as a buffer. It ensures the power compatibility between the system S3 working under MPPT condition and the system S1 working under MEPT condition during the charge mode. It ensures also the power compatibility between the power needs of the AC or DC network (system S2) and the system S1 working under MEPT condition during the discharge mode. Such a behaviour is obtained by a control of the charge/discharge current on the supercapacitors, adjusted to maintain the DC bus voltage $U_{dc}$ constant.

All these systems are linked by a common DC bus (S1, S2, S3 and S4), whose main parameter is the voltage $U_{dc}$. Such a voltage is kept constant as mentioned above.

Independently from the efficiency of the hydro-pneumatic accumulator itself, the global efficiency of such a system is strongly affected by the efficiency of each of the static converters that are cascaded during the sequential energy transfer from the solar cells to the AC or DC network, as described in [1].

The aim of this invention is to focus on the cascaded efficiency of the power electronics converters in such a conversion chain. The following discussion will be divided into three main parts:

Study of the efficiency linked to the various static converters as described in FIG. 2-1.

First, improve of the efficiency by removing the converter SC3.

Second, improve of the efficiency by removing both the converters SC3 and SC4.

Hydro-Pneumatic Storage System

As shown in FIG. 2-1, each of the main energy sources of such a system is associated with a power converter. This allows the MEPT of the hydropneumatic accumulator, and the MPPT on the solar cells. In order to ensure the power compatibility between the systems S1 and S3, the supercapacitive tank and its associated static converter are added (system S4). Energy transfers are then managed sequentially, from one energy source to the other. The aim of the following developments is to detail and characterise the efficiency of the complex energy exchanges between the various sources of the system in FIG. 2-1, as a reference to the improvements according to the invention.

Energy Fluxes/Charge Mode

The charge mode is related to energy transfers between the solar cells and the hydro-pneumatic accumulator. This mode involves the systems S1, S2 and S3, and two sequences are operated alternatively as described in FIG. 2-2.

The two sequences operated alternatively are:

Sequence 1: the converter SC3 is operated in a MPPT mode. As the generated power is not directly compatible with the power needed to charge the hydro-pneumatic accumulator under a MEPT mode, the system S1 is disabled. The system S4 is then enabled and controlled to maintain constant the DC link voltage $U_{dc}$. This results in injecting directly into the supercapacitive tank the energy coming from the solar cells. The voltage across the supercapacitive accumulator is then increasing.

Sequence 2: when the voltage across the supercapacitive tank reaches the maximum allowed value, the system S1 is enabled, and controlled to store energy into the hydro-pneumatic accumulator under the MEPT mode. As the requested power exceeds the power produced by the solar cells, the complement is assured by the supercapacitive accumulator, which is controlled to maintain constant the DC link voltage $U_{dc}$. The voltage across the supercapacitors becomes then decreasing as they give back energy. When this voltage reaches the minimum allowed value, then the sequence 1 is re-activated by disabling the system S1.

Discharge Mode

The discharge mode is related to energy transfers between the hydro-pneumatic accumulator and the AC or DC network. This mode involves the systems S1, S2 and S4, and two sequences are operated alternatively as described in FIG. 2-3.

Sequence 3: the discharge of the hydro-pneumatic accumulator is controlled by SC1 to reach MEPT conditions. Part of the power injected to the DC bus is transferred to the AC or DC network via the converter SC2. As the power needs of this network do not necessarily match the power provided by the system S1, the supercapacitive tank is enabled to absorb the excess of power coming from the hydro-pneumatic accumulator, by assuming the regulation of the DC link voltage $U_{dc}$. The voltage across the supercapacitors is then increasing.

Sequence 4: when the voltage across the supercapacitive tank reaches the maximum allowed value, the system S1 is disabled. The converter SC4 keeps the function to regulate the DC link voltage $U_{dc}$. This means that the power balance on the DC link is null: the power provided by the supercapacitive accumulator match the power needs of the AC or DC network. The supercapacitive accumulator is then in discharge mode, with a decreasing voltage. When this voltage becomes lower than the minimum allowed value, then the sequence 3 is re-activated by enabling the system S1.

Efficiency of the Power Electronics Conversion Chain

During the charge mode, as during the discharge mode, the energy transfers are operated sequentially. The MEPT mode on the hydro-pneumatic accumulator and the MPPT mode on the solar cells are then obtained thanks to the supercapacitive tank. Its main control rule is to maintain constant the DC voltage $U_{dc}$. The power balance on the DC bus is then null.

Another key point is that the energy fluxes must cross a non negligible number of static converters, from the primary energy source (solar cells) to the AC or DC network. This has a consequence on the efficiency of such a storage system, independently from the efficiency of the hydro-pneumatic accumulator itself.

In order to study the efficiency linked to the static converters, we define the efficiencies $\eta_1$, $\eta_2$, $\eta_3$ and $\eta_4$ of the static converters SC1, SC2, SC3 and SC4. We define also $\eta_s$ the global efficiency linked to the static converters for the charge mode (from the solar cells to the hydro-pneumatic accumulator), and $\eta_d$ the global efficiency linked to the static converters for the discharge mode (from the hydro-pneumatic accumulator to the AC or DC network).

During the charge mode, two energy fluxes converge to the hydro-pneumatic accumulator. The first one comes directly from the solar cells, through the converters SC3 and SC1 (FIG. 2-2, Sequence 2). The efficiency of this energy transit is defined with the product $\eta_1\eta_3$. The second comes from the solar cells, via the supercapacitive tank. This energy flux crosses first the converters SC3 and SC4 (FIG. 2-2, Sequence 1). It crosses finally the converters SC4 and SC1 (FIG. 2-2, Sequence 2). The efficiency of this energy transit is defined with the product $\eta_1\eta_3\eta_4^2$.

We introduce $p_s$ the weighting factor which defines the proportion of energy that transits from the solar cells to the hydro-pneumatic accumulator via the supercapacitive tank. Such a factor can be set between 0 and 1:
- $p_s=1$: the totality of the energy coming from the solar cells transits via the supercapacitors
- $p_s=0$: the totality of the energy coming from the solar cells transits directly toward the hydro-pneumatic accumulator.

The efficiency of the charge mode is then defined by the equation:

$$\eta_s = p_s\eta_1\eta_3\eta_4^2 + (1-p_s)\eta_1\eta_3$$

$$\Rightarrow \eta_s = \eta_1\eta_3[p_s(\eta_4^2-1)+1] \quad (1)$$

During the discharge mode, two energy fluxes converge to the network. The first one comes directly from the hydro-pneumatic accumulator, through the converters SC1 and SC2 (FIG. 2-3, Sequence 3). The efficiency of this energy transit is defined with the product $\eta_1\eta_2$. The second comes from the hydro-pneumatic accumulator, via the supercapacitive tank. This energy flux crosses first the converters SC1 and SC4 (FIG. 2-3, Sequence 3). It crosses finally the converters SC4 and SC2 (FIG. 2-3, Sequence 4). The efficiency of this energy transit is defined with the product $\eta_1\eta_2\eta_4^2$.

We introduce $p_d$ the weighting factor which defines the proportion of energy that transits from the hydro-pneumatic accumulator to the network via the supercapacitive tank. Such a factor can be set between 0 and 1:
- $p_d=1$: the totality of the energy coming from the hydro-pneumatic accumulator transits via the supercapacitors.
- $p_d=0$: the totality of the energy coming from the hydro-pneumatic accumulator transits directly toward the network.

The efficiency of the discharge mode is then defined by the equation:

$$\eta_d = p_d\eta_1\eta_2\eta_4^2 + (1-p_d)\eta_1\eta_2$$

$$\Rightarrow \eta_d = \eta_1\eta_2[p_d(\theta_4^2+1)+1] \quad (2)$$

The efficiency $\eta$ of one cycle charge and discharge is finally defined by the equation:

$$\eta = \eta_s\eta_d$$

$$\Rightarrow \eta = \eta_1^2\eta_2\eta_3[p_s(\eta_4^2+1)+1][p_d(\eta_4^2+1)+1] \quad (3)$$

As an illustration, we consider that:
The efficiency of each converter is 90%:
$p_s=0.9$: 90% of the energy coming from the solar cells transits via the supercapacitors during the charge mode.
$p_d=0.75$: 75% of the energy coming from the hydro-pneumatic accumulator transits via the supercapacitors during the discharge mode.
This gives:
Efficiency of the charge mode: $\eta_s=67.15\%$
Efficiency of the discharge mode: $\eta_d=69.45\%$
Efficiency of a cycle charge and discharge: $\eta=46.63\%$ The efficiency of the electrical part of the system in FIG. 2-1 is strongly affected by the number of static converters through which the energy flows between the solar cells and the AC or DC network. For a complete charge/discharge cycle, the number of static converters that are crossed is 8.

Illustration for the Charge Mode

Figures 1, 2, 3, 4:
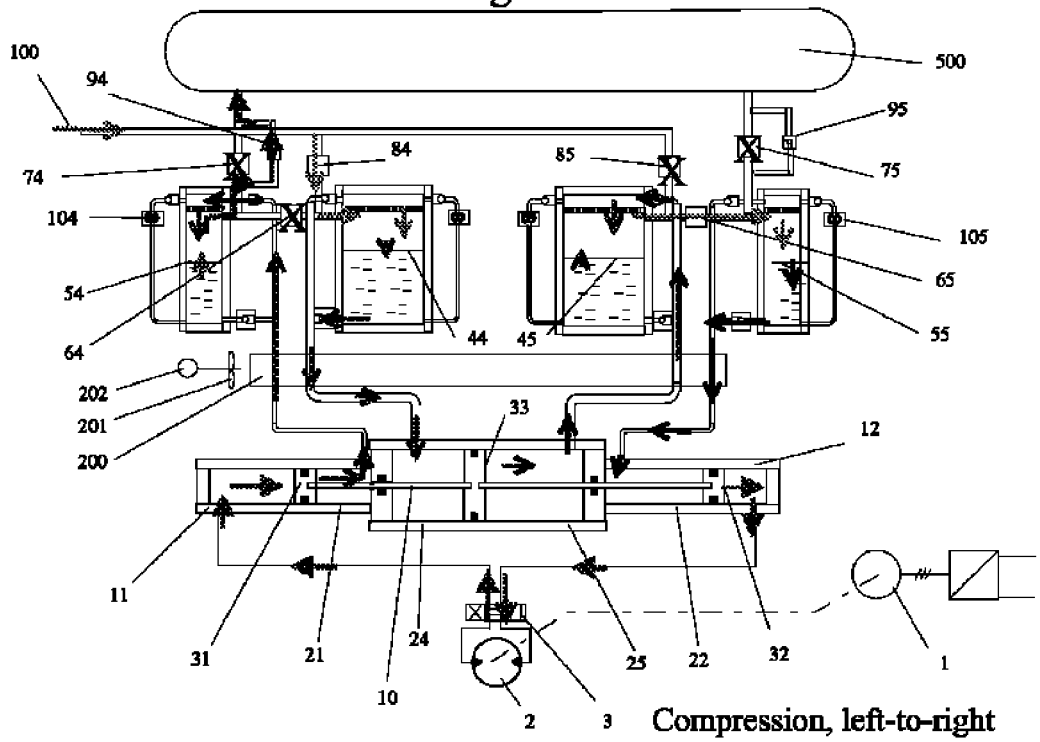
Figures 1, 2, 3, 4, 5:
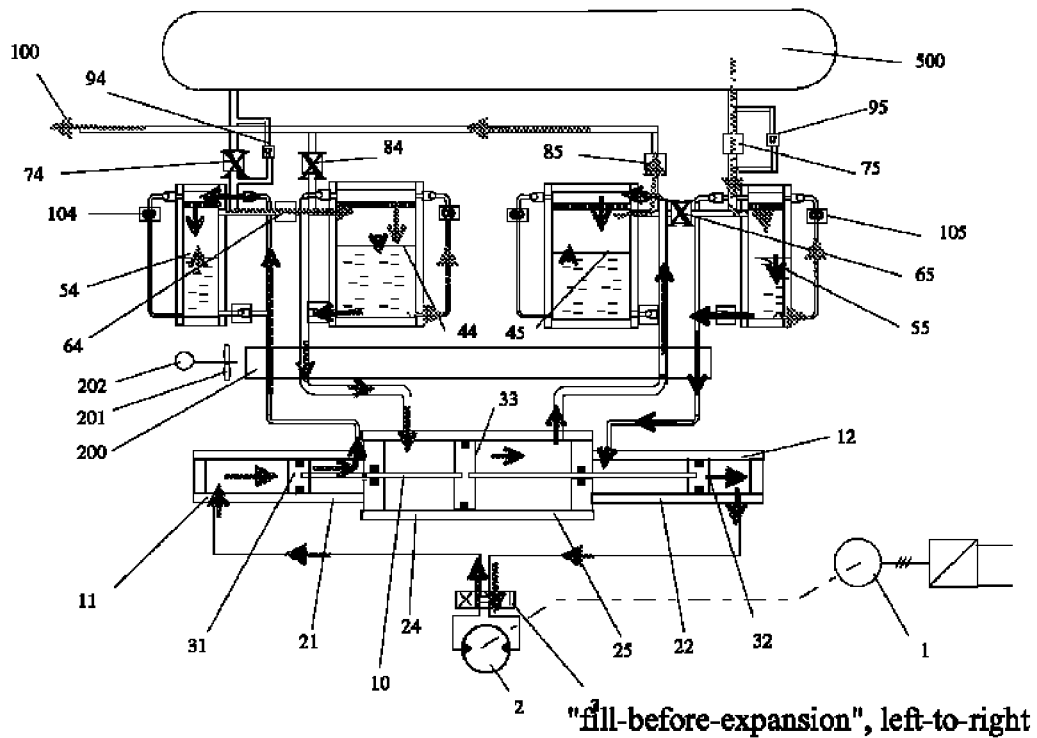
Figures 1, 2, 3, 4, 5, 6:
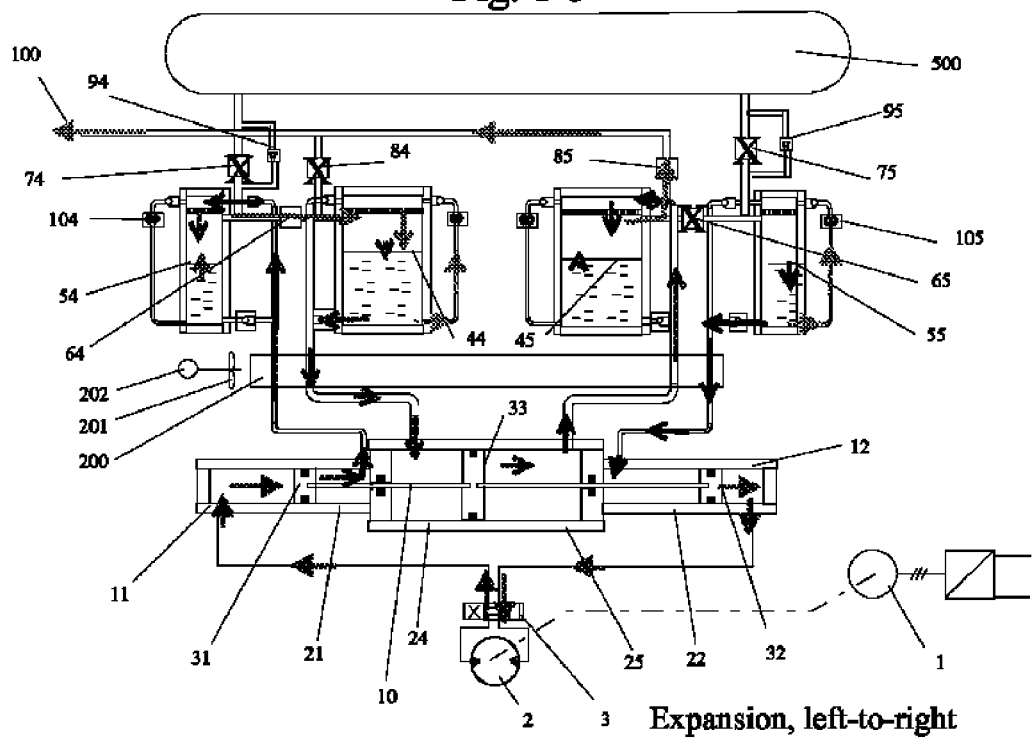
Figures 2, 3, 4, 5:
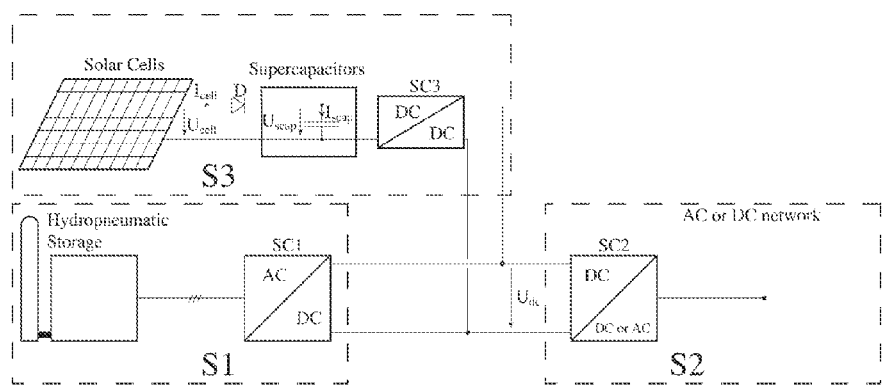
Figures 2, 3, 4, 5, 6:
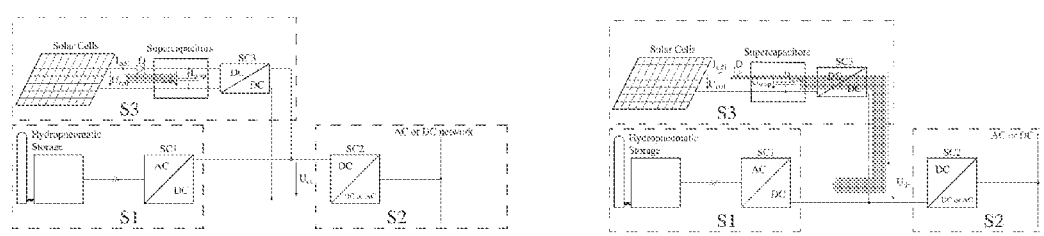
Figures 2, 3, 4, 5, 6, 7:
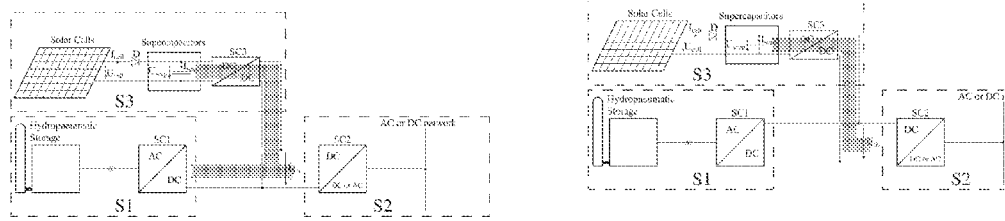
Figures 2, 3, 4, 5, 6, 7, 8:
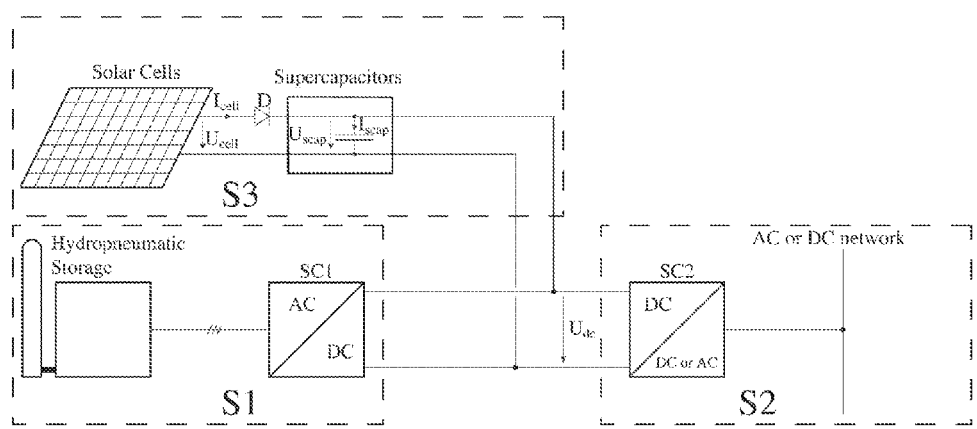
Figures 2, 3, 4, 5, 6, 7, 8, 9, 10, 11:
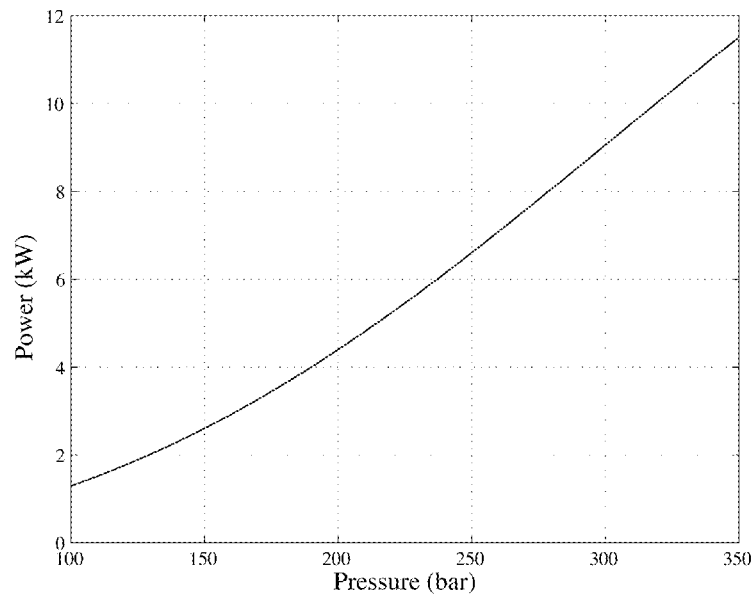
Figures 2, 3, 4, 5, 6, 7, 8, 9, 10, 11, 12:
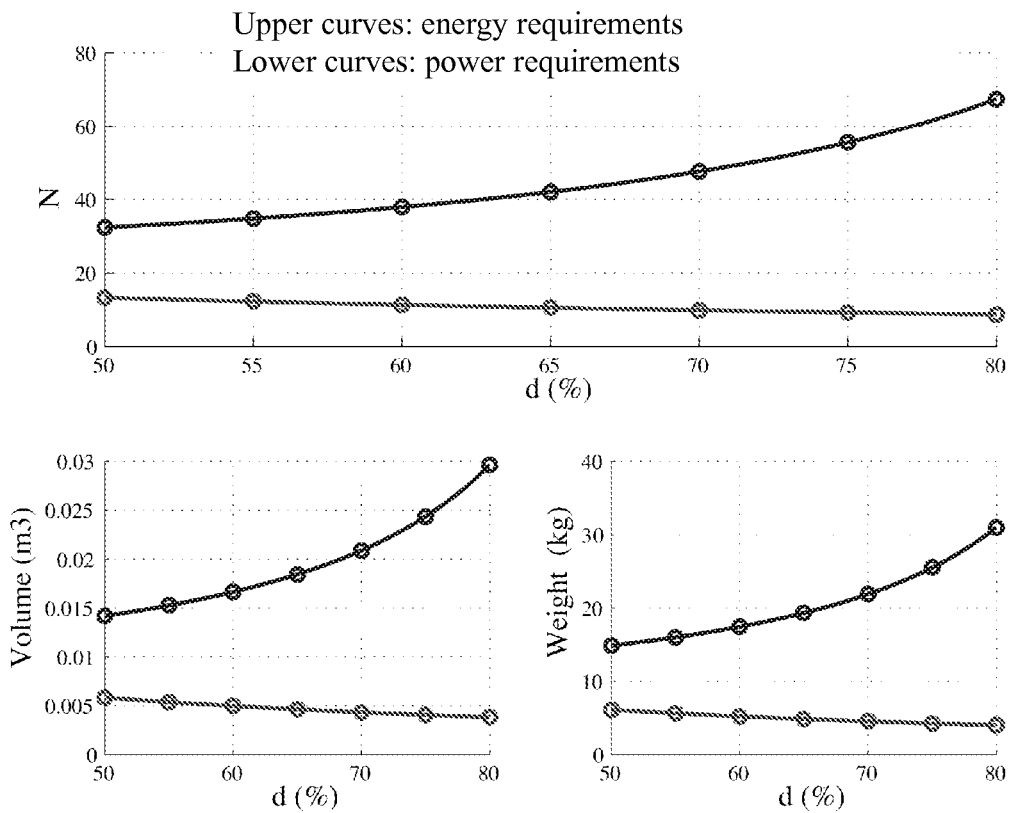
Figures 2, 3, 4, 5, 6, 7, 8, 9, 10, 11, 12, 13:
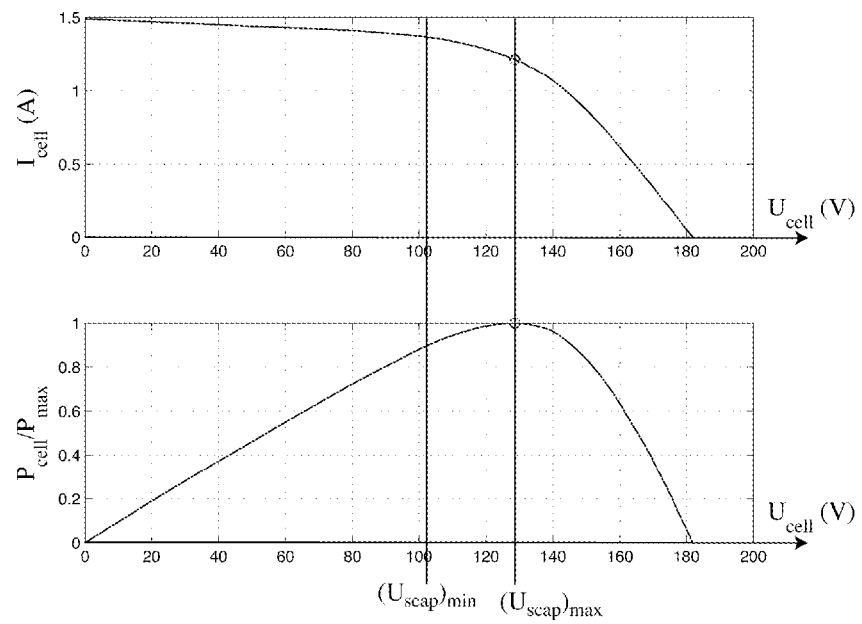
Figures 2, 3, 4, 5, 6, 7, 8, 9, 10, 11, 12, 13, 14:
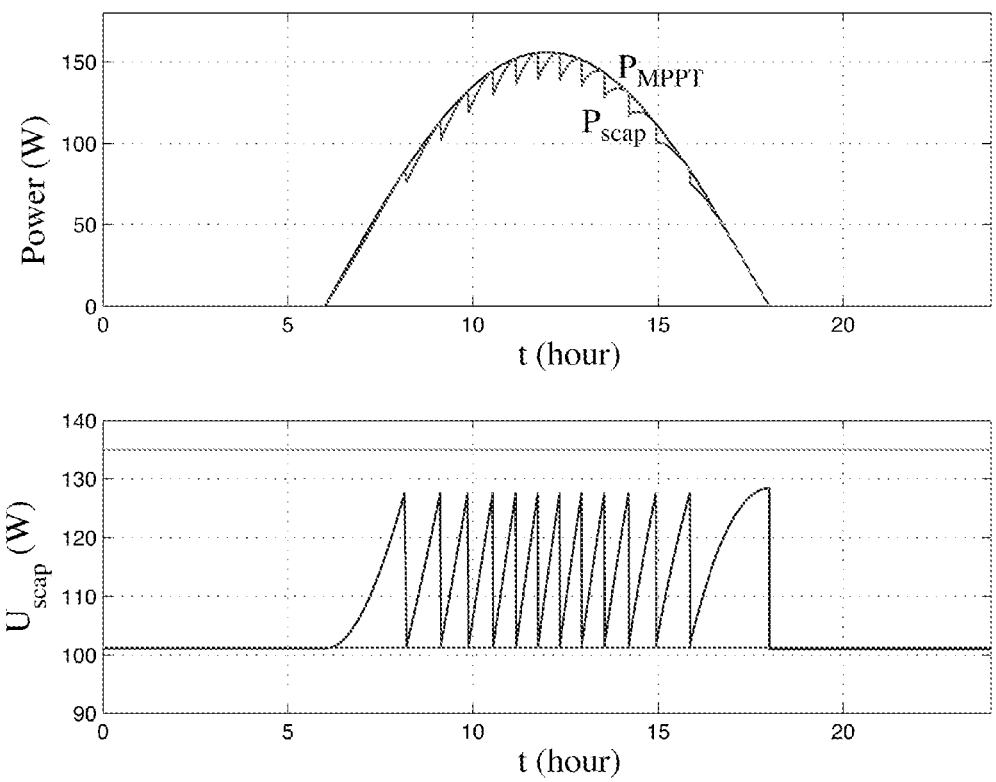
Figures 2, 3, 4, 5, 6, 7, 8, 9, 10, 11, 12, 13, 14, 15:
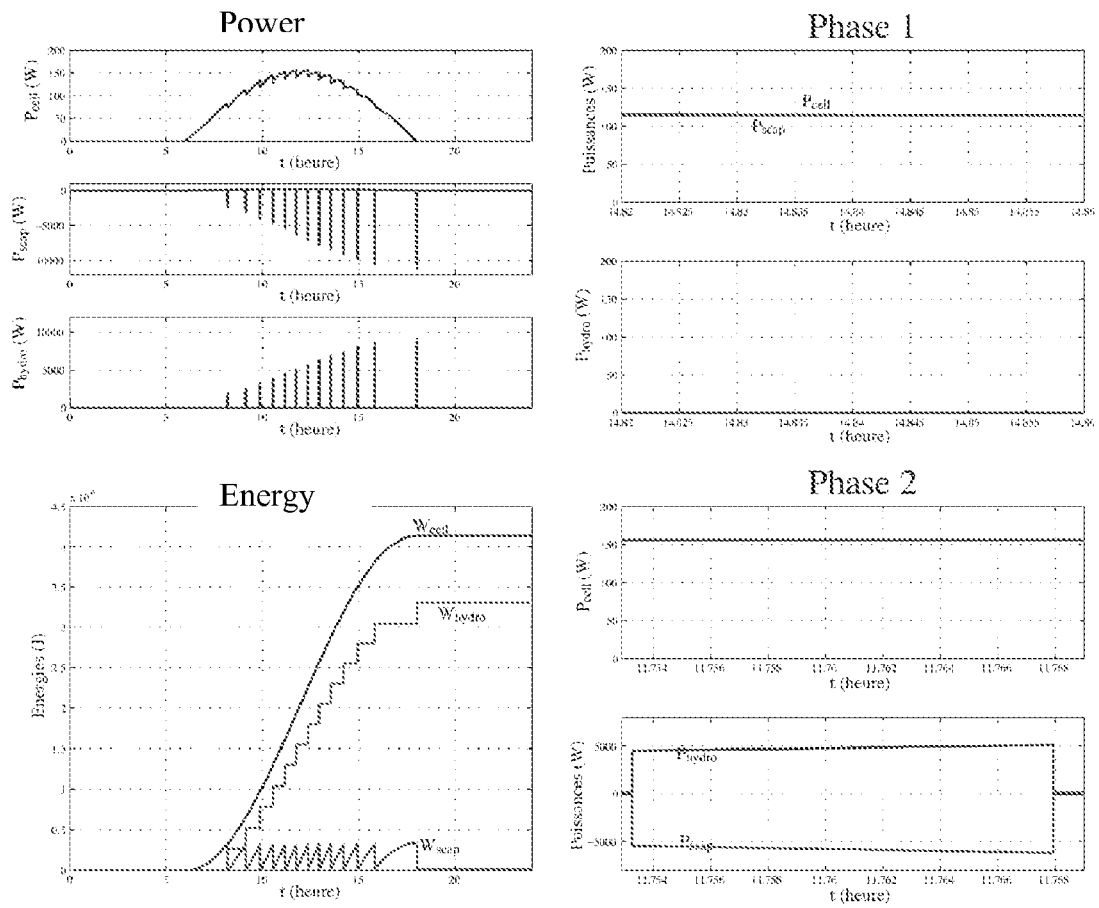
Figures 2, 3, 4, 5, 6, 7, 8, 9, 10, 11, 12, 13, 14, 15, 16:
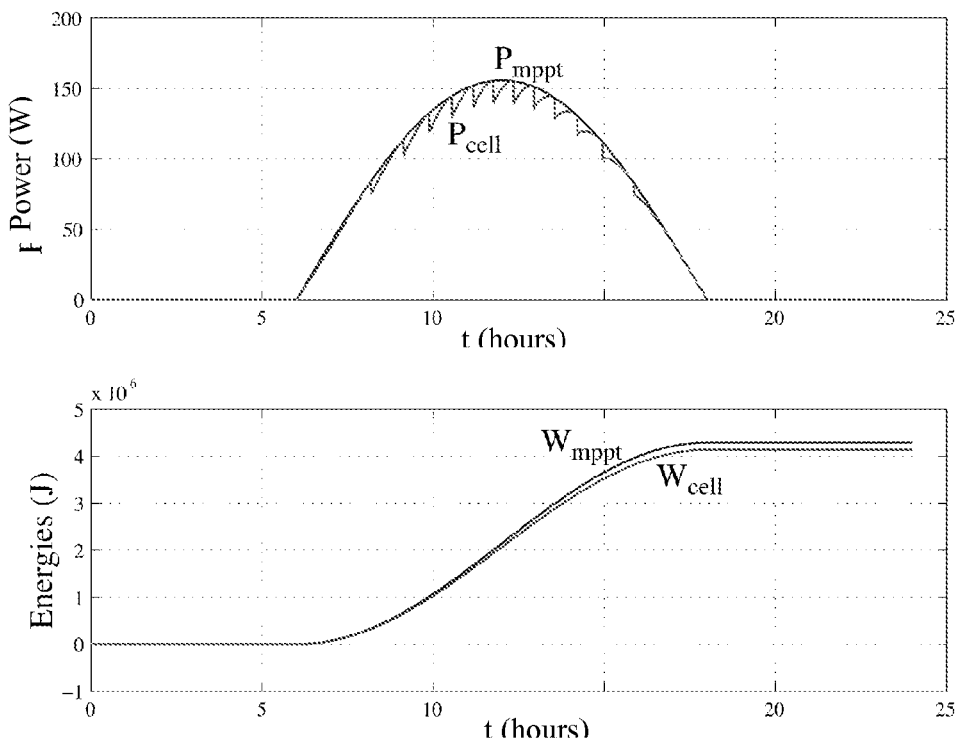
Figures 2, 3, 4, 5, 6, 7, 8, 9, 10, 11, 12, 13, 14, 15, 16, 17:
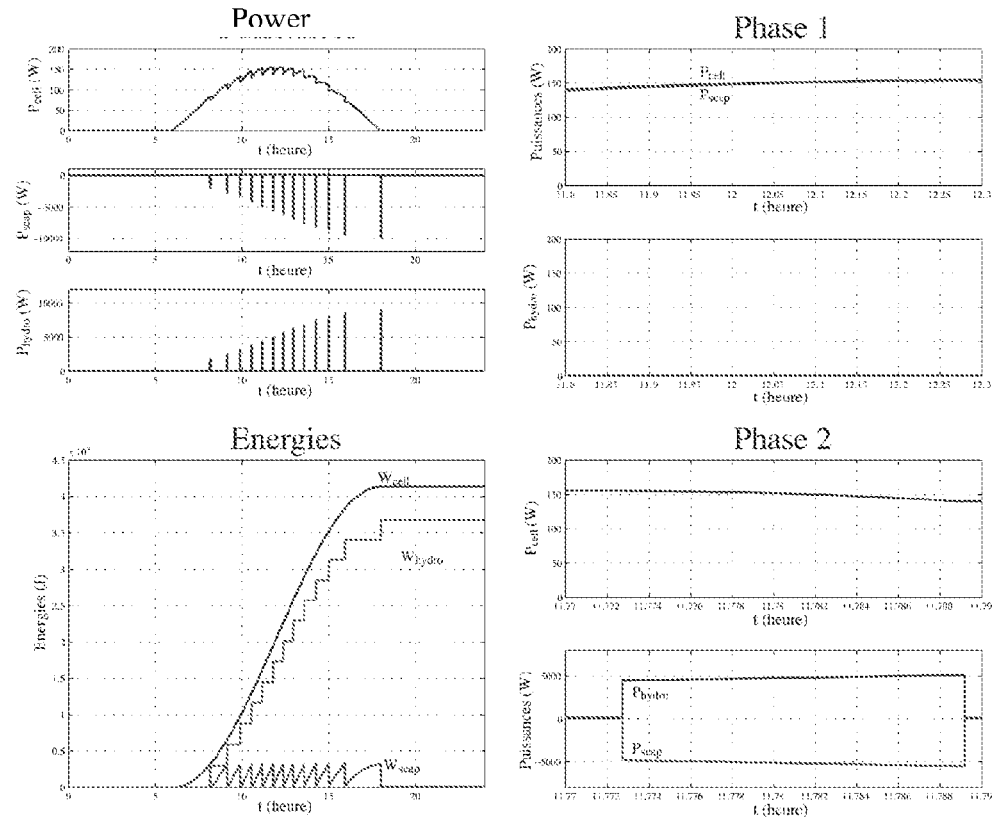
Figures 2, 3, 4, 5, 6, 7, 8, 9, 10, 11, 12, 13, 14, 15, 16, 17, 18:
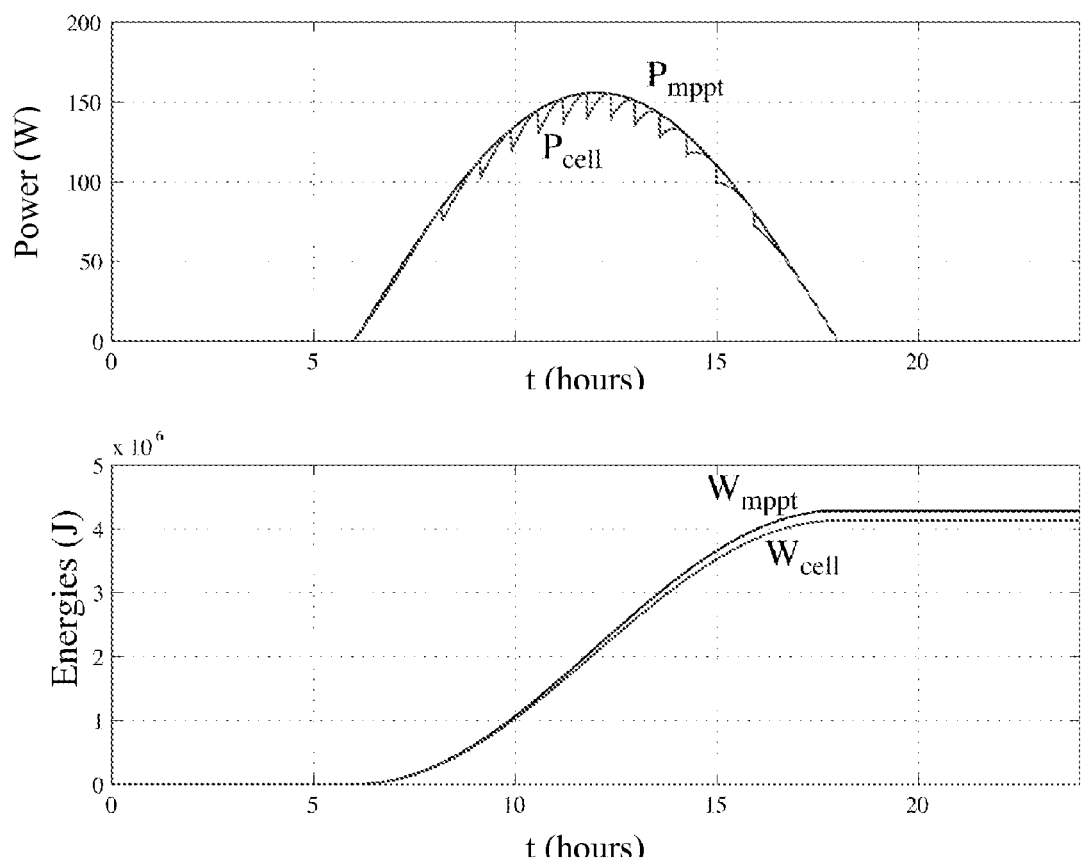
Figures 1, 3:
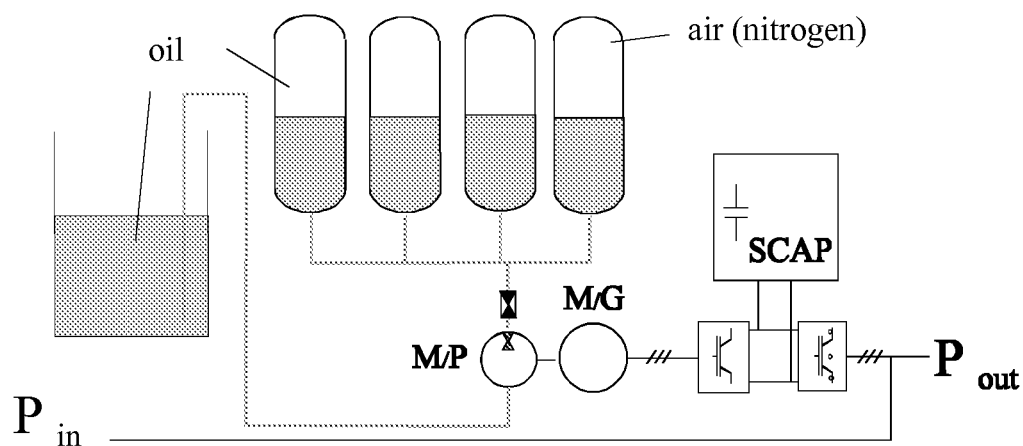
Figures 2, 3:
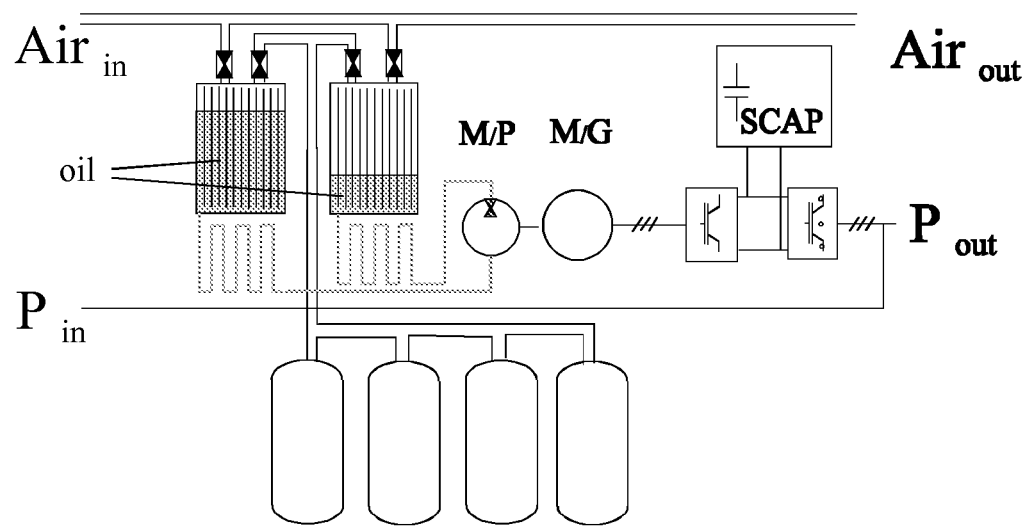
Figure 3:
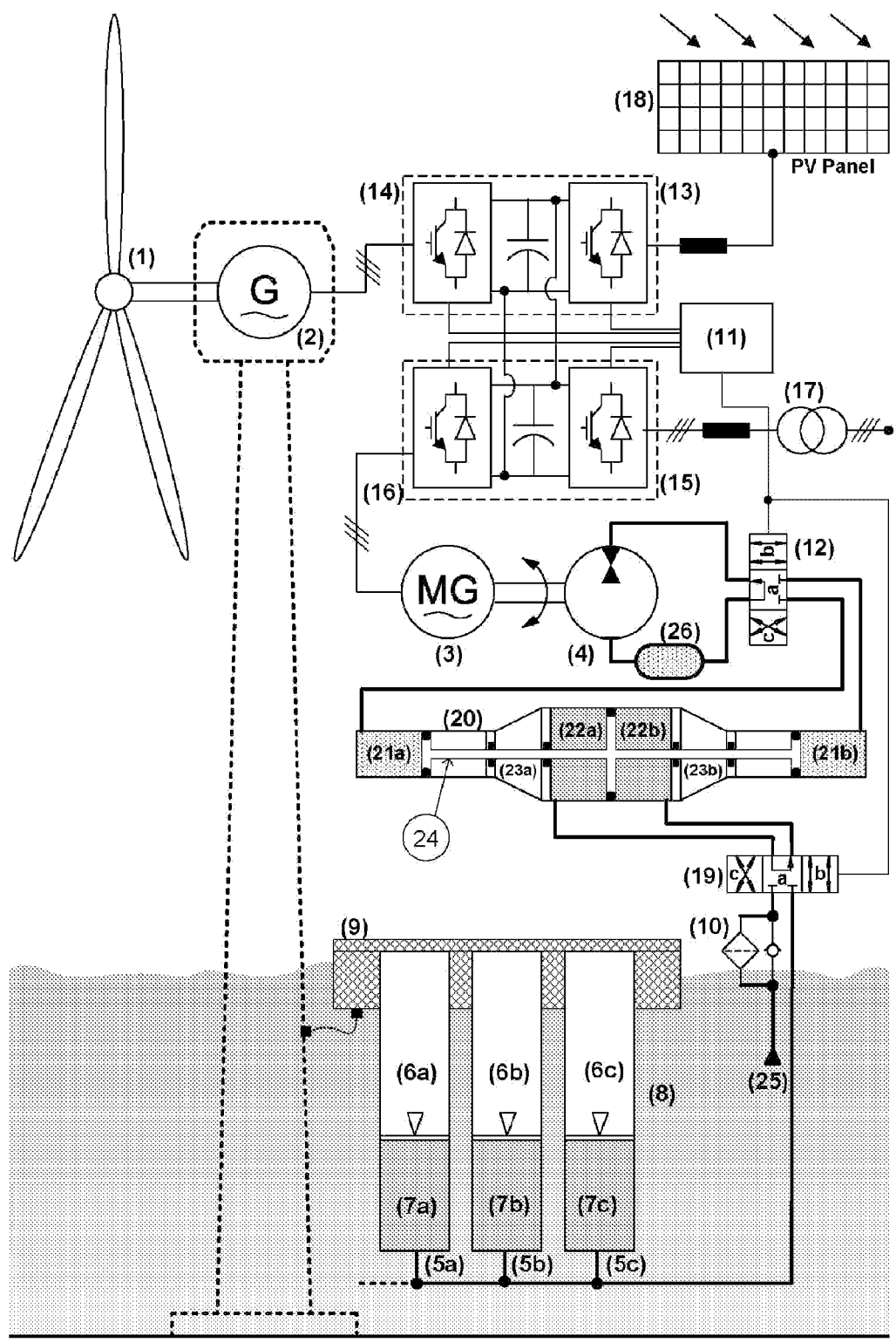
Figures 3, 4:
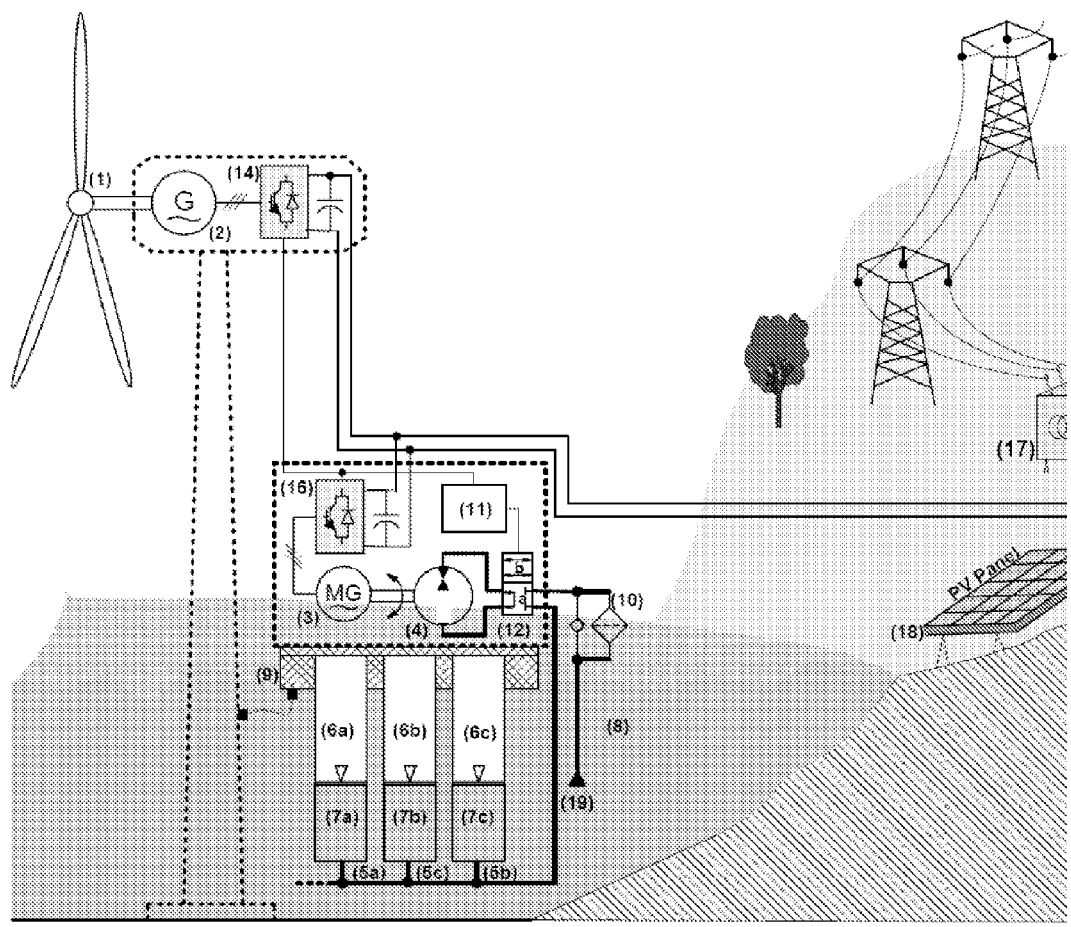
Figures 3, 4, 5:
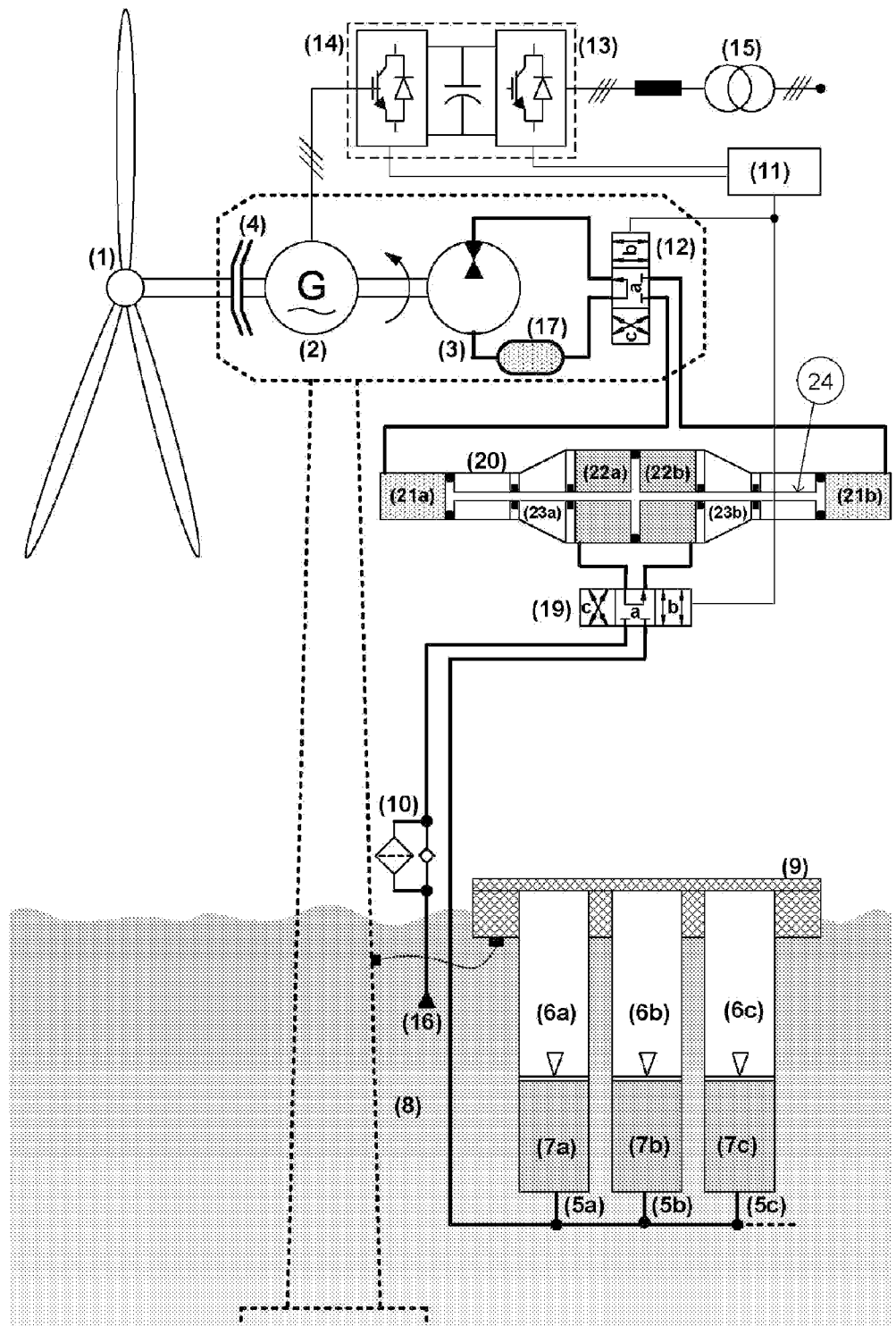
Figures 3, 4, 5, 6:
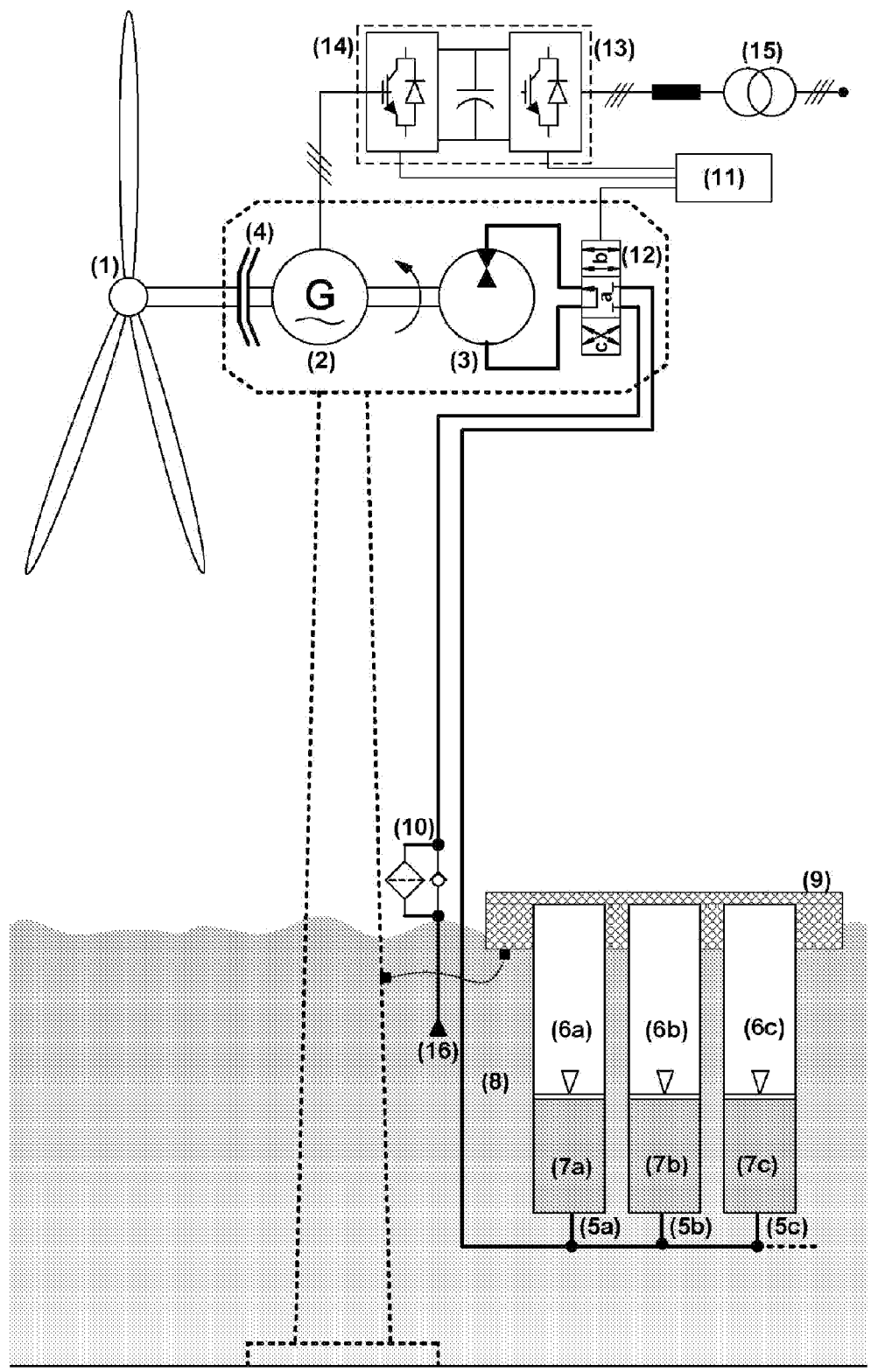
Figures 3, 4, 5, 6, 7:
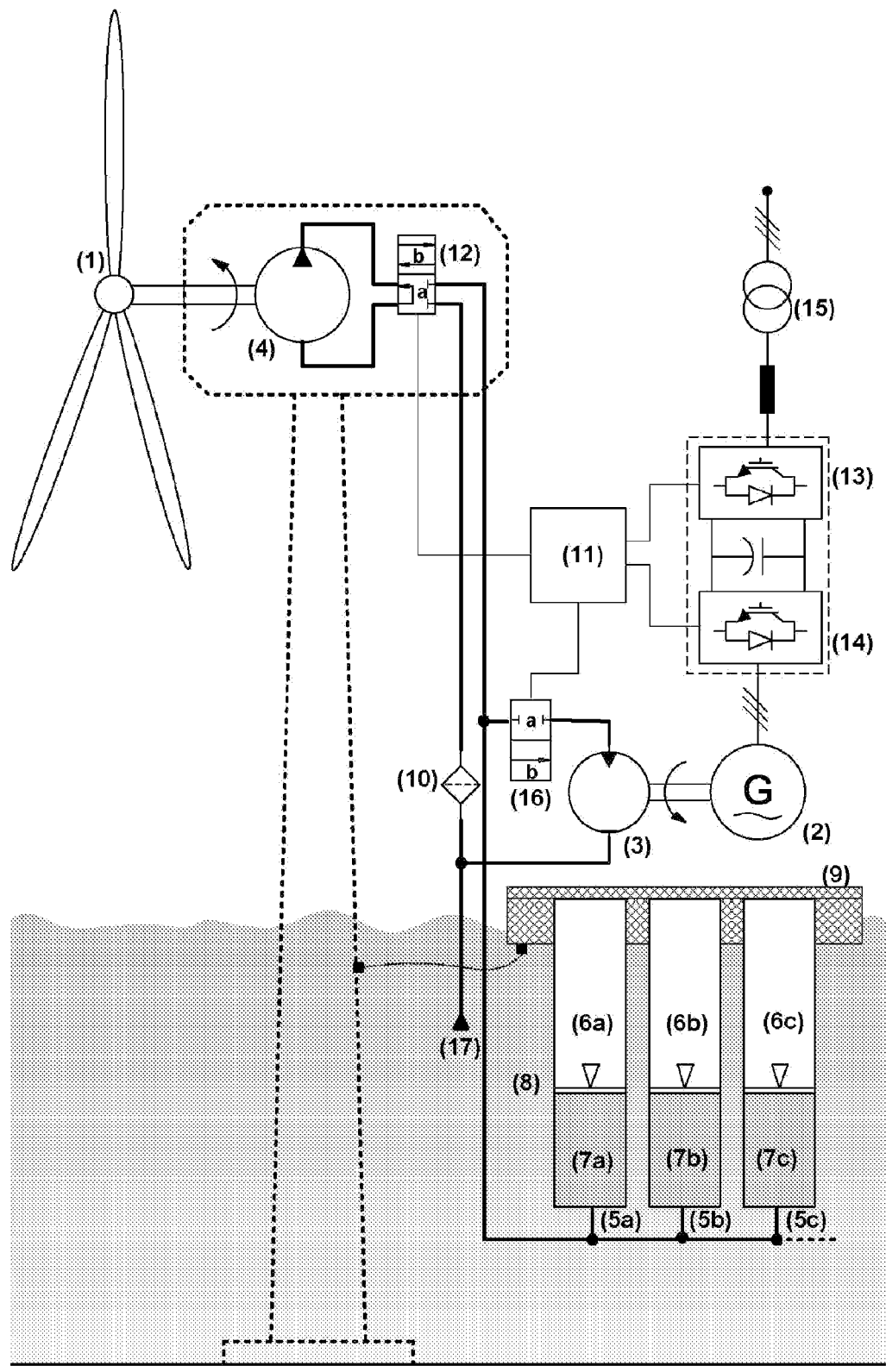

An illustration by simulation is given in FIG. 2-4. It is related to the charge mode (FIG. 2-2, Sequences 1 and 2) for a complete day (0 to 24 hour), from the solar cells to the hydropneumatic accumulator. The efficiency of the static converters that are involved (SC1, SC3 and SC4) is as defined above.

Four main results are presented in FIG. 2-4:
Power: power balance during the charge mode, where:
- $P_{cell}$ is the power from the solar cells
- $P_{scap}$ is the charge/discharge power for the supercapacitive accumulator
- $P_{hydro}$ is the charge/discharge power for the hydro-pneumatic accumulator Energy: energy balance during the charge mode, where:
- $W_{cell}$ is the energy from the solar cells
- $W_{scap}$ is the energy stored into the supercapacitive accumulator
- $W_{hydro}$ is the energy stored into the hydro-pneumatic accumulator Sequence 1: is a zoom on power balance during Sequence 1 of FIG. 2-2.
Sequence 2: is a zoom on power balance during Sequence 2 of FIG. 2-2.

The power $P_{cell}$ from the solar cells is obtained by the control of SC3, ensuring the MPPT mode. The power $P_{scap}$ into the supercapacitive tank is positive during the Sequence 1, during energy flow from the solar cells to the supercapacitors. One can note the cumulated efficiency of SC3 and SC4. Then, $P_{scap}<P_{cell}$. The power $P_{scap}$ is negative during the Sequence 2, while energy from the solar cells and the supercapacitors is injected into the hydro-pneumatic accumulator.

The power $P_{hydro}$ injected into the hydro-pneumatic accumulator is defined by the control of SC1 that ensures the MEPT mode during Sequence 2. During the Sequence 1, the converter SC1 is disabled and $P_{hydro}$ is null. Because of the efficiency of each of the converters, one can note that $P_{hydro}<P_{cell}-P_{scap}$.

The efficiency of the charge mode is operated with an energy balance at the end of the day. It is the ratio between the energy from the solar cells and the sum of the energies stored into the supercapacitors and the hydro-pneumatic accumulator. For this simulation results, calculations give $\eta_s=67.47\%$. This result must be compared to the theoretical results we have identified above ($\eta_s=67.15\%$).

Two inventive propositions to increase the efficiency from the photovoltaic panel to the hydro-pneumatic system will now be described:

General Comments

Independently from the efficiency of the hydro-pneumatic accumulator itself, the number of cascaded static converters leads to a low efficiency during energy transfers for a complete charge/discharge cycle. The two inventive solutions described in this section focus on the efficiency linked to the electrical conversion part of such a storage system, even if the other components (the hydro-pneumatic accumulator) have a non negligible influence. The main improvement in the two inventive solutions we propose is then to reduce the number of static converters compared to the initial configuration of FIG. 2-1.

Solution without MPPT Converter (3Cvs)

The first improvement over the system in FIG. 2-1 consists in the connection of the supercapacitors directly in parallel of the solar cells, as it is shown in FIG. 2-5.

As for the initial solution in FIG. 2-1, in FIG. 2-5:
  The system S1 is the hydro-pneumatic accumulator itself, fed by the static converter SC1. SC1 is controlled to enable charge and discharge processes along the MEPT mode.
  The system S2 is the AC or DC network where energy is finally injected by the way of the static converter SC2.
  For the system S3, as the solar cells are directly coupled with the supercapacitors, a diode D is inserted to avoid any reverse current into the solar cells due to the discharge of the supercapacitors. One can note that:
    The MPPT is not directly possible as no static converter is directly connected to the solar cells.
    As for the initial solution in FIG. 2-1, the static converter SC3 allows the regulation of the DC link voltage $U_{dc}$ during charge and discharge mode.

Energy Fluxes

The charge mode is related to energy transfers between the solar cells and the hydro-pneumatic accumulator. This mode involves the systems S1 and S3, and two sequences are operated alternatively as described in FIG. 2-6. In FIG. 2-6's charge mode, the two sequences operated alternatively are:
1. Sequence 1: Energy from the solar cells is injected directly into the supercapacitive tank. All the converters are disabled. This sequence 1 defines the charge of the supercapacitors, directly from the solar cells as there is no more static converters to control such an energy transfer. As a consequence, the MPPT mode on the solar cells cannot be strictly obtained. The supercapacitive tank defines the voltage applied across the solar cells, depending on its charge status. Depending on the voltage across the supercapacitors, the solar cells deliver a current that is also a function of the sunning. As the generated power is not directly compatible with the power needed to charge the hydro-pneumatic accumulator under a MEPT mode, the system S1 is disabled. The energy from the solar cells is then directly injected into the supercapacitive tank. The voltage across the supercapacitive accumulator is then increasing.
2. Sequence 2: When the voltage across the supercapacitive tank reaches the maximum allowed value, the system S1 is enabled, and controlled to store energy into the hydro-pneumatic accumulator under the MEPT mode. As the requested power exceeds the power produced by the solar cells, the complement is assured by the supercapacitive accumulator, which is controlled to maintain constant the DC link voltage $U_{dc}$ thanks to the static converter SC3. The voltage across the supercapacitors becomes then decreasing as they give back energy. When this voltage reaches the minimum allowed value, then the sequence 1 is re-activated by disabling the system S1.

The discharge mode is related to energy transfers between the hydro-pneumatic accumulator and the AC or DC network. This mode involves the systems S1, S2 and S3, and two sequences are operated alternatively as described in FIG. 2-6.

FIG. 2-3 shows the discharge mode. In Sequence 3, energy from the hydro-pneumatic accumulator is injected to the supercapacitive tank and the network: (SC1: MEPT; SC2: control of voltage/current on the network; SC3: regulation of $U_{dc}$.) and in Sequence 4 energy is transferred from the supercapacitors to the network: (SC2: control of voltage/current on the network; SC3: regulation of $U_{dc}$). Such a sequential energy transfer is strictly identical to that one already defined for the initial system of FIG. 2-1.

Inventive Solution without MPPT Converter Nor DC/DC Converter as Interface to the Main DC (2Cvs)

The second improvement from the system in FIG. 2-1, which is an evolution from FIG. 2-5, consists in the connection of the solar cells and the supercapacitors directly in parallel of DC bus, as it is shown in FIG. 2-5. This solution with solar cells and supercapacitors in parallel with the DC bus is shown in FIG. 2-8. As for the initial solution in FIG. 2-1:
  The system S1 is the hydro-pneumatic accumulator itself, fed by the static converter SC1. SC1 is controlled to enable charge and discharge processes along the MEPT mode.
  The system S2 is the AC or DC network where energy is finally injected by the way of the static converter SC2.
  For the system S3, as the solar cells are directly coupled with the supercapacitors, a diode D is provided to avoid any reverse current into the solar cells due to the discharge of the supercapacitors. One can note that:
    The MPPT is not directly possible as no static converter is connected to the solar cells.
    As there are no converters between the system S3 and the DC bus, the voltage $U_{dc}$ is no longer constant, but will vary as a function of the charge status of the supercapacitive tank. In other words, the power balance at the DC bus level is different from zero, whereas it was null for the solutions in FIG. 2-1 and in FIG. 2-5.

Energy Fluxes

The charge mode is related to energy transfers between the solar cells and the hydro-pneumatic accumulator. This mode involves the systems S1 and S3, and two sequences are operated alternatively as described in FIG. 2-9. The two sequences operated alternatively are:
  Sequence 1: Energy from the solar cells is injected directly into the supercapacitive tank. All the converters are disabled. This sequence defines the charge of the supercapacitors, directly from the solar cells as there is no more static converters to control such an energy transfer. As a consequence, the MPPT mode on the solar cells cannot be strictly obtained. The supercapacitive tank defines the voltage applied across the solar cells and the voltage $U_{dc}$ of the DC bus, depending on its charge status. Depending on the voltage across the supercapacitors, the solar cells deliver a current that is also a function of the sunning. As the generated power is not directly compatible with the power needed to charge the hydro-pneumatic accumulator under a MEPT mode, the system S1 is disabled. The energy from the solar cells is then directly injected into the supercapacitive tank. The voltage across the supercapacitive accumulator, and the voltage of the DC bus $U_{dc}$ increases.

Sequence 2: When the voltage across the supercapacitive tank reaches the maximum allowed value, the system S1 is enabled, and controlled to store energy into the hydro-pneumatic accumulator under the MEPT mode. As the requested power exceeds the power produced by the solar cells, the complement is assured by the supercapacitive accumulator. The voltage across the supercapacitors, and the voltage $U_{dc}$ decrease then as supercapacitors are is their discharge mode. When this voltage reaches the minimum allowed value, then the sequence 1 is re-activated by disabling the system S1.

The discharge mode is related to energy transfers between the hydro-pneumatic accumulator and the AC or DC network. This mode involves the systems S1, S2 and S3, and two sequences are operated alternatively as described in FIG. 2-10. The two sequences operated alternatively are:

Sequence 3: The discharge of the hydro-pneumatic accumulator is controlled by SC1 to reach MEPT conditions. Part of the power injected to the DC bus is transferred to the AC or DC network via the converter SC2. As the power needs of this network do not necessarily match the power provided by the system S1, the supercapacitive tank absorbs the excess of power coming from the hydro-pneumatic accumulator. The voltage across the supercapacitors increases then, together with the voltage of the DC bus $U_{dc}$.

Sequence 4: When the voltage across the supercapacitive tank reaches the maximum allowed value, the system S1 is disabled. The power needs of the DC or AC network must be then covered by the supercapacitive accumulator, that switches into its discharge mode. The voltage across the supercapacitors, and of course the DC link voltage $U_{dc}$, decrease. When these voltages become lower that the minimum allowed value for the supercapacitors, then the sequence 3 is re-activated by enabling the system S1.

One can note that the sequence 3 (and the charge of the supercapacitors) is only possible if the power from the hydro-pneumatic accumulator under MEPT is always higher than the power needs of the network. Such a remark is valid whatever the configuration is (FIG. 2-1, FIG. 2-5 and FIG. 2-8).

Criterion for Sizing the Supercapacitive Tank and Controlling Energy Fluxes

As usual, the supercapacitive tank must be sized to match energy requirements, power availability (defines the efficiency of the accumulator). These two requirements are mainly defined with the hydro-pneumatic accumulator. The supercapacitors must in particular ensures the MEPT mode during sequence 2 (FIG. 2-6, FIG. 2-9) and sequence 3 (FIG. 2-7, FIG. 2-10), for duration equal to at least 20 sec.

In the particular frame where the supercapacitors are directly connected to solar cells, two additional criteria must be taken into account to allow the MPPT on the solar cells even if there no more converters dedicated to this function:

The arrangement of the supercapacitors into the tank to ensure the voltage compatibility versus the characteristics of the solar cells, The control of the supercapacitors charge status by the appropriate succession of sequences 1 and 2 (FIG. 2-6, FIG. 2-9).

Energy and Power Requirements

Energy and power requirements are defined by the hydro-pneumatic accumulator, as the supercapacitive tank must match energy and power needs for the MEPT conditions during sequence 2 (FIG. 2-6, FIG. 2-9) and sequence 3 (FIG. 2-7, FIG. 2-10). Such requirements can be obtained from FIG. 2-11.

The pressure into the tank of the hydro-pneumatic accumulator depends on its charge status. On the example shown in FIG. 2-11, this pressure can reach the maximum value $p_{rmAx}=350$ bar. Depending on the pressure during charge and discharge (that varies because the level of stored energy varies), the electrical power to supply the pump must then be adapted to match MEPT conditions as shown in FIG. 2-11. The maximum value this power can reach is $P_{MAX}=11.5$ kW.

FIG. 2-11 is related to the charge mode. For the discharge mode, the power is negative.

The sizing of the supercapacitive tank can be made focusing on the charge mode of the hydro-pneumatic accumulator only:

Power requirement: the supercapacitors must be able to provide the maximum power $P_{MAX}$, with a given efficiency $\eta_{cap}$, Energy requirements: considering a worst case, the tank must provide the maximum constant power $P_{MAX}$ during at least $t_{min}=20$ sec. Then, defining $W_u$ the usable energy that must be stored in the supercapacitive tank:

$$W_u = P_{max} t_{min} \qquad (4)$$

As an example, considering FIG. 2-11 again, the energy and power requirements for sizing the supercapacitive tank are:

$P_{MAX}=11.5$ kW, where we can specify $\eta_{cap} \geq 90\%$ $t_{min}=20$ sec, $W_u=230$ kJ$=63.9$ W·h From such requirements, the sizing procedure for a supercapacitive tank is followed according to [2]. The supercapacitors that are considered are from Maxwell (2600F/2.7V, 0.41 m-Ohms). It leads to results described in FIG. 2-12, where the number N of needed supercapacitors, the total volume and weight are given as a function of the discharge ratio d.

Such results show that there is no unique solution for the particular example of the system described in [1], depending on the voltage discharge ratio d. Another comment is that the main sizing criterion is the energy requirement, that will lead to an efficiency much higher than the 90% that were initially considered.

Maximum Voltage and MPPT

The last criteria required to finalize the sizing of the supercapacitive tank are related to the voltage level for this accumulator. As the supercapacitors of the systems of FIG. 2-5 and FIG. 2-8 are directly connected to the solar cells, the voltage $U_{scap}$ across the supercapacitive tank and the voltage $U_{cell}$ across the solar cells are identical, and define the charging current from the solar cells ($I_{cell}$) to the supercapacitors ($I_{scap}$). As a consequence, during sequence 1 of FIG. 2-6 and FIG. 2-9:

$$\begin{cases} U_{cell} = U_{scap} \\ I_{cell} = I_{scap} \end{cases} \qquad (5)$$

Because of the characteristics of the solar cells, $U_{cell}$ and $I_{cell}$ are linked together, as shown in FIG. 2-13 for a particular sunning condition. The power $P_{cell}$ as a function of $U_{cell}$ is also plotted. The state of charge for the supercapacitive tank is defined with the voltage $U_{scap}$ across it. This voltage defines then the current $I_{cell}=I_{scap}$ coming from the solar cells to charge the supercapacitors. It defines also the power $P_{cell}$ from the solar cells, which is the power absorbed during sequence 1 of FIG. 2-6 and FIG. 2-9 for the charge of the supercapacitive tank. From this, one can define two parameters:

($U_{scap})_{max}$: the maximum allowed voltage for the supercapacitive tank, ($U_{scap})_{min}$: the minimum allowed voltage for the supercapacitive tank, after discharge into the hydropneumatic accumulator.

A key point on the characteristics of solar cells as defined in FIG. 2-13 is the particular voltage that defines the maximum power the cells can provide for given sunning conditions.

During the charge of the supercapacitors from the solar cells, the voltage $U_{scap}$ is increasing. If $U_{scap}$ is lower than the voltage $U_{MPPT}$ that defines the maximum power from the solar cells, then the charging power is increasing. If $U_{scap}$ is higher than the voltage $U_{MPPT}$, then the charging power is decreasing. It is then required to maintain always the voltages $U_{cell}=U_{scap}$ lower than $U_{MPPT}$ in order to ensure that the power is increasing during the charge of the supercapacitors. If such a condition is not implemented, the voltage $U_{scap}$ continues to increase while the power coming from the solar cells decrease. The charge of the supercapacitors in such a condition is not optimized, as supercapacitors can absorb during their charge an increasing power as $U_{scap}$ increases.

A main rule becomes then to stop the sequence 1 of FIG. 2-6 and FIG. 2-9 (direct charge of the supercapacitors from the solar cells) as soon as:

$$(U_{scap})_{max} = U_{MPPT} \quad (6)$$

This last equation becomes a main criterion, as it defines two conditions:

It is then the main criterion to switch from sequence 1 to sequence 2 of FIG. 2-6 and FIG. 2-9. Obviously the voltage $U_{MPPT}$ that defines the maximum power from the solar cells is not constant but depends on the sunning conditions. It has then to be estimated with conventional MPPT algorithms. One can note that the incremental conductance MMPT search algorithm is well dedicated. Such an algorithm is described in [3].

It is a sizing criterion for the supercapacitive tank, as the condition on equation (6) defines the maximum voltage across the tank that must be reached without over-voltage on the supercapacitors that are series connected for the realisation of the tank. Assuming that $U_{Max}$ is the maximum voltage for one single supercapacitor and N is the number of series connected supercapacitors, then the following criterion must be satisfied:

$$N_s U_{Max} = (U_{scap})_{max} = U_{MPPT} \quad (7)$$

It is obvious that the maximum voltage across a supercapacitor must not be exceeded, as the criterion (7) depends on $U_{MPPT}$ which is a function of the sunning conditions. One can then consider the parameter $(U_{MPPT})_{max}$ that defines the voltage across the solar cells under MPPT conditions for maximum sunning on the cells. The number $N_s$ of series connected supercapacitors is then determined for the following worst case:

$$[1/N_s U_{Max} = (U_{MPPT})_{max} \quad (8)$$

This last criterion allows then the identification of the number of series connected supercapacitors, once their maximum voltage is know (datas from manufacturer), and once the solar cells have been characterised:

$$N_s = \frac{(U_{MPPT})_{max}}{U_{Max}} \quad (9)$$

As an example, one can consider again the typical curves of FIG. 2-13, obtained for a given solar panel under maximum sunning conditions. The voltage across the solar cells under maximum power conditions is $(U_{MPPT})_{max}=128V$. Considering supercapacitors with a maximum voltage $U_{Max}=2.7V$, the equation (9) gives the number of needed series connected supercapacitors to match $(U_{MPPT})_{max}$ without constraints: $N=47.4\cong48$.

This result must then be confronted to the initial sizing of the supercapacitive tank regarding the energy and power requirements related to the hydro-pneumatic accumulator. The main results of the example we have considered here are summarized in FIG. 2-12. It appears then that the choice of N=48 resulting to the direct coupling of the supercapacitors to the solar cells with MPPT criterion leads to also to match the energy and power requirements related to the hydro-pneumatic accumulator in the case where d=70%.

This final choice is interesting because it enable an additional freedom for managing the level of stored energy into the supercapacitors: the choice of d=70% leads to an over-sized supercapacitive tank regarding the needs of the hydro-pneumatic accumulator, and when sunning conditions are at their maximal values (giving at the end of the sequence 1 $(U_{scap})_{max}=(U_{MPPT})_{max}$). However, for non-maximal sunning conditions the voltage across the supercapacitors at the end of the sequence 1 will not reach $(U_{scap})_{max}=(U_{MPPT})_{max}$, but $(U_{scap})_{max}=U_{MPPT}<(U_{MPPT})_{max}$. The level of stored energy into the supercapacitors is then not maximal, and it is then necessary to let the voltage across the supercapacitors decrease to a value of $(U_{scap})_{min}$ that will be lower than the value that defines d=70%, in order to match energy requirements for the hydro-pneumatic accumulator during the sequence 2.

From this example, one can summarize the sizing procedure for the supercapacitive tank connected directly one the solar cells, in order to match energy and power requirements for the hydro-pneumatic accumulator and to allow MPPT conditions:

Energy and power requirement must be identified from the hydro-pneumatic accumulator. This leads to a family of possible sizing for the supercapacitive tank, that must allow MEPT mode for the hydro-pneumatic accumulator.

Regarding the maximum voltage $(U_{MPPT})_{max}$, the number of series connected supercapacitors $N_s$ in one branch can be identified.

If $N_s$ satisfy directly one of the solutions proposed by the first step of this approach then the final number of supercapacitors is $N=N_s$. If not, then $N_p$ parallel branches of $N_s$ supercapacitors must be defined, in order to match $N=N_s N_p$ that match one of the solutions proposed by the first step of this approach.

The main criteria to switch from sequence 1 to sequence 2 of FIG. 2-6 and FIG. 2-9 are:

From sequence 1 to sequence 2: when the voltage across the supercapacitive tank (or the solar cells) reaches the voltage that defines MPPT conditions for the solar cells.

From sequence 2 to sequence 1: when the voltage across the supercapacitive tank decreases to the value $(U_{scap})_{min}$ which is defined to keep the discharge ratio d to the value identified by the first step of this approach. One can note that $(U_{scap})_{min}$ must not be too far of $(U_{scap})_{max}$ to keep the voltage across the solar cell close to the voltage that defines MPPT conditions.

An example is given in FIG. 2-14, on a complete day, where the parameters $(U_{scap})_{min}$ and $(U_{scap})_{max}$ are set constant as $U_{MPPT}$ stays constant during the whole sunning conditions of the day with the model we have implemented.

Such a simulation results shows mainly the power $P_{MPPT}$ that the solar cells should deliver under strict MPPT conditions. This reference power is compared to the charge/discharge power $P_{scap}$ into the supercapacitors.

During sequence 1, $P_{scap}=P_{cell}$ the supercapacitors are in their charge mode. Their voltage is increasing. When $P_{scap}=P_{cell}=P_{MPPT}$, then the sequence 2 is activated. The supercapacitors are in their discharge mode (to the hydro-pneumatic accumulator). Once the voltage reaches $(U_{scap})_{min}$, then the sequence 1 is activated.

(Efficiency Analysis/Efficiency of the Solar Cells with No MPPT Converter)

As introduced above, the power delivered by the solar cells must stay as close as possible from the power defined under MPPT mode, even if no dedicated converter is inserted to ensure this property. For the two described solutions according to the invention, 3Cvs and 2Cvs, this property is obtained directly by the control of the voltage variations across the supercapacitive tank:

$(U_{scap})_{max}=U_{MPPT}$: the voltage across the supercapacitive tank must not be higher than the voltage that defines MPPT conditions for the solar cells. When this equality is reached, then the sequence 2 of FIG. 2-6 and FIG. 2-9 is enabled.

$(U_{scap})_{min}$ during the sequence 2, the power delivered by the solar cells is $p_{cell}(P_{cell})_{max}$, with $0<p_{cell}<1$. The analysis of FIG. 2-13 shows that the more $(U_{scap})_{min}$ is close from $(U_{scap})_{max}$, the more $p_{cell}$ will be close from 1, offering so conditions close to a strict MPPT mode. When $(U_{scap})_{min}$ is reached, then the sequence 1 of FIG. 2-6 and FIG. 2-9 is enabled.

Considering the example of FIG. 2-13 for the definition of $(U_{scap})_{min}$, one can affirm that the power delivered by the solar cells varies between 0.9 $(P_{cell})_{max}$ ($p_{cell}$=0.9) and $(P_{cell})_{max}$ ($p_{cell}$=1). This leads to the definition of the efficiency $\eta_{cell}$ of MPPT mode in case of no dedicated converter (solutions 3Cvs and 2Cvs), as the averaged value of the factor $p_{cell}$ along a complete cycle (sequences 1 and 2 of FIG. 2-6 and FIG. 2-9). Regarding the example we consider here, $\eta_{cell}$=0.95.

It becomes then obvious that the voltage $(U_{scap})_{min}$ must be adapted, as well as $(U_{scap})_{max}$, depending on sunning conditions.

Efficiency of the Solution without MPPT Converter (3Cvs)

From the solar cells to the AC or DC network, the energy must cross a reduced number of static converters if we compare the topology in FIG. 2-5 to the initial configuration of FIG. 2-1. We define the efficiencies $\eta_1$, $\eta_2$, $\eta_3$ of the static converters SC1, SC2, and SC3. One can define also $\eta_{cell}$ the efficiency that defines the ratio between the energy extracted from the solar cells and the energy that should be extracted under strict MPPT conditions. We define also $\eta_s$ the global efficiency linked to the static converters for the charge mode (from the solar cells to the hydro-pneumatic accumulator), and $\eta_d$ the global efficiency linked to the static converters for the discharge mode (from the hydro-pneumatic accumulator to the AC or DC network).

During the charge mode, the energy flux is operated first from the solar cells to the supercapacitors (sequence 1), and then from the supercapacitors to the hydro-pneumatic accumulator (sequence 2):

Sequence 1: the efficiency of this sequence is defined by $\eta_{cell}$, as losses into the supercapacitors can be neglected (low level for the charging current).

Sequence 2: the energy flux cross first SC3, and then SC1. The analysis of FIG. 2-12 shows also that losses into the supercapacitors will be negligible. The efficiency of this sequence will be then by the product $\eta_1\eta_3$.

The efficiency of the charge mode is then defined be the equation:

$$\eta_s=\eta_{cell}\eta_1\eta_3 \quad (10)$$

During the discharge mode, two energy fluxes converge to the network:

The first one comes directly from the hydro-pneumatic accumulator, through the converters SC1 and SC2 (FIG. 2-7, Sequence 3). The efficiency of this energy transit is defined with the product $\eta_1\eta_2$.

The second comes from the hydro-pneumatic accumulator, via the supercapacitive tank. This energy flux crosses first the converters SC1 and SC3 (FIG. 2-7, Sequence 3). It crosses finally the converters SC3 and SC2 (FIG. 2-7, Sequence 4). The efficiency of this energy transit is defined with the product $\eta_1\eta_2\eta_3^2$.

We define $p_d$ the weighting factor which defines the proportion of energy that transits from the hydro-pneumatic accumulator to the network via the supercapacitive tank. Such a factor can be set between 0 and 1:

$p_d$=1: the totality of the energy coming from the hydro-pneumatic accumulator transits via the supercapacitors.

$p_d$=0: the totality of the energy coming from the hydro-pneumatic accumulator transits directly toward the network.

The efficiency of the discharge mode is then defined by the equation:

$$\eta_d=p_d\eta_1\eta_2\eta_3^2+(1-p_d)\eta_1\eta_2$$
$$\Rightarrow \eta_d=\eta_1\cdot\eta_2[p_d(\eta_3^2-1)+1] \quad (11)$$

The efficiency $\eta$ of one cycle charge and discharge is finally defined by the equation:

$$\eta=\eta_s\eta_d$$
$$\Rightarrow \eta=\eta_1^2\eta_2\eta_3\eta_{cell}[p_d(\eta_3^2-1)+1] \quad (12)$$

As an illustration, we consider that:
The efficiency of each converters is 90%:
The voltage variation across the supercapacitive tank is adjusted to obtain $\eta_{cell}$=0.95
$p_d$=0.75: 75% of the energy coming from the hydro-pneumatic accumulator transits via the supercapacitors during the discharge mode.
This gives:
Efficiency of the charge mode: $\eta_s$=76.95%
Efficiency of the discharge mode: $\eta_d$=69.45%
Efficiency of a cycle charge and discharge: $\eta$=53.45%

Even if no dedicated power converter can assume strict MPPT condition on the solar cells, the global efficiency of a complete charge/discharge cycle is increased (see §2.3), thanks to the reduction of the static converters (3 instead of 4 for the initial configuration).

Efficiency for the Solution without MPPT Converter nor DC/DC Converter as Interface to the Main DC (2Cvs)

From the solar cells to the AC or DC network, the energy must cross a reduced number of static converters if we compare the topology in FIG. 2-8 to the initial configuration of FIG. 2-1. We define the efficiencies $\eta_1$, $\eta_2$ of the static converters SC1, and SC2. One can define also $\eta_{cell}$ the efficiency that defines the ratio between the energy extracted from the solar cells and the energy that should be extracted under strict MPPT conditions. We define also $\eta_s$ the global efficiency linked to the static converters for the charge mode (from the solar cells to the hydro-pneumatic accumulator), and $\eta_d$ the global efficiency linked to the static converters for the discharge mode (from the hydro-pneumatic accumulator to the AC or DC network).

During the charge mode, the energy flux is operated first from the solar cells to the supercapacitors (sequence 1), and then from the supercapacitors to the hydro-pneumatic accumulator (sequence 2):

Sequence 1: the efficiency of this sequence is defined by $\eta_{cell}$, as losses into the supercapacitors can be neglected (low level for the charging current).

Sequence 2: the energy flux cross only one converter, SC1. The analysis of FIG. 2-12 shows also that losses into the supercapacitors will be negligible. The efficiency of this sequence will be then by the product $\eta_1$.

The efficiency of the charge mode is then defined be the equation:

$$\eta_s = \eta_{cell}\eta_1 \tag{13}$$

During the discharge mode, the energy flux cross in any case the two converters SC1 and SC2. The efficiency of the discharge mode is then defined be the equation:

$$\eta_d = \eta_1\eta_2 \tag{14}$$

The efficiency $\eta$ of one cycle charge and discharge is finally defined by the equation:

$$\eta = \eta_s\eta_d$$

$$\Rightarrow \eta = \eta_1^2\eta_2\eta_{cell} \tag{15}$$

As an illustration, we consider that:

The efficiency of each converters is 80% (lower than the efficiencies consider previously as their input voltage is no more constant but varies with the voltage across the supercapacitors)

The voltage variation across the supercapacitive tank is adjusted to obtain $\eta_{cell}=0.95$ This gives:

Efficiency of the charge mode: $\eta_s=76\%$
Efficiency of the discharge mode: $\eta_d=64\%$
Efficiency of a cycle charge and discharge: $\eta=48.64\%$ As there is no power converter to assume strictly MPPT conditions on the solar cells, and as the input voltage of each of the converter can vary (with a decrease of their efficiency), the global efficiency of a complete charge/discharge cycle is near of the efficiency of the initial system of FIG. 2-1. However, the efficiency can be increased if the voltage variation for the supercapacitors is limited. Also, there is a financial gain as only two static converters are needed, instead of 4 for original solution in FIG. 2-1.

Illustration for the Charge Mode

Solution without MPPT Converter (3Cvs)

An illustration by simulation is given in FIG. 2-15. It is related to the charge mode (FIG. 2-6, Sequences 1 and 2) for a complete day (0 to 24 hour), from the solar cells to the hydro-pneumatic accumulator. The efficiency of the static converters that are involved (SC1, SC2 and SC3) is as defined above.

FIG. 2-4 illustrates the charge mode, power and energy balance with a zoom on Sequences 1 and 2. Four main results are presented in FIG. 2-15:

Power: power balance during the charge mode, where:
$P_{cell}$ is the power from the solar cells
$P_{scap}$ is the charge/discharge power for the supercapacitive accumulator
$P_{hydro}$ is the charge/discharge power for the hydro-pneumatic accumulator Energy: energy balance during the charge mode, where:
$W_{cell}$ is the energy from the solar cells
$W_{scap}$ is the energy stored into the supercapacitive accumulator
$W_{hydro}$ is the energy stored into the hydro-pneumatic accumulator Sequence 1: is a zoom on power balance during Sequence 1 of FIG. 2-6.
Sequence 2: is a zoom on power balance during Sequence 2 of FIG. 2-6.

The power $P_{scap}$ into the supercapacitive tank is positive during the Sequence 1, during the direct energy flow from the solar cells to the supercapacitors. One can note that the efficiency of this sequence is close to 100% (losses into the supercapacitors are effectively negligible), and is negative during the Sequence 2, while the energy transfer from the supercapacitors to the hydro-pneumatic accumulator.

The power $P_{hydro}$ injected into the hydro-pneumatic accumulator is defined by the control of SC1 that ensures the MEPT mode during Sequence 2. During the Sequence 1, $P_{hydro}$ is null. Because of the efficiency of each of the converters, one can note that $P_{hydro}<-P_{scap}$.

FIG. 2-16 illustrates the power and energy effectively extracted. It shows a power and an energy balance between: the power $P_{MPPT}$ that the solar cells should provide under strict MPPT conditions and the power $P_{cell}$ effectively extracted; and the energy $W_{MPPT}$ that the solar cells should provide under strict MPPT conditions and the energy $W_{cell}$ effectively extracted. The efficiency of the charge mode is operated with an energy balance at the end of the day. It is the ratio between the energy that the solar cells should provide under strict MPPT conditions and the energy effectively stored into the hydropneumatic accumulator. For this simulation results, calculations give $\eta_s=77.49\%$. This result must be compared to the theoretical results we have identified above (§3.5.2), where $\eta_s=76.95\%$.

Solution without MPPT Converter nor DC/DC Converter as Interface to the Main DC (2Cvs)

An illustration by simulation is given in FIG. 2-17. It is related to the charge mode (FIG. 2-9, Sequences 1 and 2) for a complete day (0 to 24 hour), from the solar cells to the hydro-pneumatic accumulator. The efficiency of the static converter that is involved (SC1) is as defined above.

FIG. 2-17 illustrates the charge mode, power and energy balance with a zoom on Sequences 1 and 2. Four main results are presented in FIG. 2-17:

Power: power balance during the charge mode, where:
$P_{cell}$ is the power from the solar cells
$P_{scap}$ is the charge/discharge power for the supercapacitive accumulator
$P_{hydro}$ is the charge/discharge power for the hydro-pneumatic accumulator Energy: energy balance during the charge mode, where:
$W_{cell}$ is the energy from the solar cells
$W_{scap}$ is the energy stored into the supercapacitive accumulator
$W_{hydro}$ is the energy stored into the hydro-pneumatic accumulator Sequence 1: is a zoom on power balance during Sequence 1 of FIG. 2-9.

Sequence 2: is a zoom on power balance during Sequence 2 of FIG. 2-9.

The power $P_{scap}$ into the supercapacitive tank is positive during the Sequence 1, during the direct energy flow from the solar cells to the supercapacitors. One can note that the efficiency of this sequence is close to 100% (losses into the supercapacitors are effectively negligible). The power is negative during the Sequence 2, while the energy transfer from the supercapacitors to the hydro-pneumatic accumulator.

The power $P_{hydro}$ injected into the hydro-pneumatic accumulator is defined by the control of SC1 that ensures the MEPT mode during Sequence 2. During the Sequence 1, $P_{hydro}$ is null. Because of the efficiency of each of the converters, one can note that $P_{hydro} < -P_{scap}$ FIG. 2-18 shows the power and energy effectively extracted. It shows a power and an energy balance between: the power $P_{MPPT}$ that the solar cells should provide under strict MPPT conditions and the power $P_{cell}$ effectively extracted; and the energy $W_{MPPT}$ that the solar cells should provide under strict MPPT conditions and the energy $W_{cell}$ effectively extracted. The efficiency of the charge mode is operated with an energy balance at the end of the day. It is the ratio between the energy that the solar cells should provide under strict MPPT conditions and the energy effectively stored into the hydro-pneumatic accumulator. For this simulation results, calculations give $\eta_s=76.49\%$. This result must be compared to the theoretical results we have identified above (§3.5.2), where $\eta_s=76\%$.

General Comparison

In order to compare the respective performances of each of the solutions proposed in FIG. 2-1, FIG. 2-5 and FIG. 2-8, reference is made to Table 1 that tabulates the efficiencies linked to each of these solutions.

A first improvement is achieved by connecting directly in parallel the solar cells and the supercapacitive tank, via a diode to avoid any reverse current into the solar cells. The supercapacitive tank is sized in order to:

Allow a MPPT on the solar cells. The main sizing criterion is the maximal voltage delivered by the solar cells $(U_{MPPT})_{max}$. Moreover, the range of voltage variation across the supercapacitive tank must be limited to ensure an efficient MPPT mode.

Allow MEPT conditions on the hydro-pneumatic accumulator. The sizing criteria consist in energy requirement and power availability.

A second improvement consists in the connection of the group solar cells and supercapacitors directly on the main DC bus of the system. For this second solution, the limitation of voltage variation across the supercapacitive tank offers a double advantage:

A high efficiency for the static converters fed directly by this voltage,

An efficient MPPT mode for the solar cells.

3. Immersed Hydro-Pneumatic Energy Storage (IHPES) Systems for Offshore and Onshore Renewable Power Smoothing and Levelling A third main aspect of the invention relates to a dedicated energy storage solution to enhance offshore and onshore electric power generation systems, fed by renewable energy sources, such as wind and solar sources. The so called "Immersed Hydro-Pneumatic Energy Storage (IHPES)" systems particularly fit those offshore conditions and are efficient for onsite smoothing and levelling of the fluctuating generated power.

The IHPES systems comprise two main parts: an immersed storage capacity and a conversion subsystem. The storage capacity is made of several gas-charged cylindrical accumu-

TABLE 1

| | FIG. 2-1<br>$\eta_1 = \eta_2 = \eta_3 = \eta_4 = 90\%$ | FIG. 2-5<br>$\eta_1 = \eta_2 = \eta_3 = 90\%$ | FIG. 2-8 | |
|---|---|---|---|---|
| | $\eta_{cell} = 100\%$<br>$p_s = 0.9, p_d = 0.75$ | $\eta_{cell} = 95\%$<br>$p_d = 0.75$ | $\eta_1 = \eta_2 = 80\%$<br>$\eta_{cell} = 95\%$ | $\eta_1 = \eta_2 = 90\%$<br>$\eta_{cell} = 95\%$ |
| $\eta_s$ | $\eta_1 \cdot \eta_3[p_s(\eta_4^2 - 1) + 1]$<br>67.15% | $\eta_{cell} \cdot \eta_1 \cdot \eta_3$<br>76.95% | $\eta_{cell} \cdot \eta_1$<br>76% | 85.5% |
| $\eta_d$ | $\eta_1 \cdot \eta_2[p_d(\eta_4^2 - 1) + 1]$<br>69.45 | $\eta_1 \cdot \eta_2[p_d(\eta_3^2 - 1) + 1]$<br>69.45% | $\eta_1 \cdot \eta_2$<br>64% | 81% |
| $\eta$ | $\eta_1^2 \cdot \eta_2 \cdot \eta_3[p_s(\eta_4^2 - 1) + 1][p_d(\eta_4^2 - 1) + 1]$<br>46.64% | $\eta_1^2 \cdot \eta_2 \cdot \eta_3 \cdot \eta_{cell}[p_d(\eta_3^2 - 1) + 1]$<br>53.44% | $\eta_1^2 \cdot \eta_2 \cdot \eta_{cell}$<br>48.64% | 69.25% |

Observations:

The direct connection of the supercapacitors on the solar cells as proposed in FIG. 2-5 and in FIG. 2-8 offers a gain on the global efficiency, and in any case on the efficiency during the charge mode.

The system in FIG. 2-8 can be defined by a poor efficiency if the efficiency of the two converters is low because of a large voltage variation on the supercapacitors. However, as the MPPT mode on the solar cells needs to limit this voltage variation, the efficiency of the converters will not be so strongly affected compared to the prior examples. This would then lead to an increased global efficiency, together with a reduced number of static converters.

From the original solution shown in FIG. 2-1, the two solutions according to the invention provide an increase in the efficiency of a complete charge/discharge cycle, focusing on the efficiency linked to the various static converters of such a system:

lators. Its immersion allows reducing the visual impact and land occupancy, but also improves the thermodynamic efficiency thanks to the larger heat exchange surface with the surrounding water. Many configurations of the conversion subsystem are possible, that can be classified in 3 categories depending on the means of interfacing the storage system with the power sources: electrically interfaced IHPES systems; mechanically interfaced IHPES systems and hydraulically interfaced IHPES systems. For each category, it is possible to use either oil-hydraulic or water-hydraulic machines. These various topologies and configurations offer a great flexibility and many possibilities of using this storage concept to fit the particular requirement of each installation.

Compressed air energy systems have been for years a subject of different R&D projects around the world, from classical technologies to innovative approaches as described in [1]-[4]. Two hydro-pneumatic storage concepts have been of our particular interest:

The first system, so called "BOP-A: Battery with Oil-hydraulics and Pneumatic, type A", is based on the principle of the gas-charged hydraulic accumulators well known in industry. In these devices a trapped amount of gas (generally nitrogen) separated by a bladder or a membrane or free piston, is compressed by pumping a liquid (generally oil), which acts like a kind of piston, into the vessel. The potential energy thus stored can be restored later by expanding the gas, which will drive the liquid out of the vessel. A schematic diagram of such a system is represented in FIG. 3-1. As the mass of gas remains unchanged during the process, the gas cycle is defined as closed.

In opposition to BOP-A, the BOP-B system operates with an open air cycle, which results in a higher energy density. In BOP-B, a reciprocating liquid-piston system operates as an isothermal volumetric machine to compress fresh air taken from outside, and later expand it to do work. A hydraulic motor/pump alternately drives the two liquid piston cylinders as can be seen on the simplified diagram of FIG. 3-2. These two BOP concepts are described more in details in [3] and [4].

The main advantage of the BOP-A system is its simple and efficient conversion chain due the physical separation of the two active fluids. However, this system exhibits a low energy density, which is firstly due to the small residual volume of gas at compressed state, and secondly to the external reservoir required to store the compressing oil at discharge (expanded) state that substantially increases the overall volume of the system. For those reasons, this storage technology is most suited for applications where volume and weight are not very critical.

The present invention concerns a specific storage system based on the closed gas cycle concept as in the aforementioned case of BOP-A system, but specially designed for being used in water, as immerged or floating systems. The application field of the presented storage devices is the fast developing area of renewable energy sources, especially wind and photovoltaic in remote areas where the space occupancy does not matter too much.

Nowadays, there is a clear tendency to install wind generation facilities offshore because of the advantageous wind conditions on those locations and also to avoid the harmful acoustic effects and visual impact of windmills inland. Floating windmills have been proposed also and a demonstration installation is under construction in the North Sea [6]. As for photovoltaic systems, they are very attractive in islands, because of the great difficulty to connect the local electric systems to the continental interconnected grids. Storage facilities are necessary to circumvent the stochastic nature of some renewable sources like wind and solar sources; they can allow generating more smooth and levelled power easier to integrate into the grid, and also performing a day-to-night power shift especially for photovoltaic.

The IHPES systems present the advantage of being feasible offshore, directly near the generators. They are designed to use the site-water (sea, lake, etc.) and the immersion reduces the impact of their large volume.

Many configurations of Immersed Hydro-Pneumatic Energy Storage systems can be realized depending on the specifications of each application. The main possible configurations are represented in FIGS. 3-3 to 3-7. They exhibit a similar general structure with two main parts: The immersed storage unit and the conversion package. This separation of the power part and the energy part offers a more flexibility in designing and sizing the system.

The storage unit is common to all the IHPES systems. It is made of several gas-charged piston accumulators ($5a$, $5b$, $5c$ . . . ) with the hydraulic ports connected in parallel. The first advantage of using many small size cylindrical accumulators instead of a single large storage volume is that they can be easily realised from existing industrial products like oil and gas pipes. The second advantage is that the cylinders offer to the charged gas ($6a$, $6b$, $6c$ . . . ) a greater heat-exchange surface with the surrounding water which is always at constant temperature, allowing thus an easy achievement of isothermal compression/expansion and therefore higher thermodynamic efficiencies.

Energy is stored by injecting filtered water ($7a$, $7b$, $7c$ . . . ) into the accumulators to compress the trapped-gas. The process is reversed during energy restoration; the gas expands and drives the water out of the accumulator to do work. The storage capacity depends on the maximum pressure, the compression ratio and the number of accumulators [4]. It can be varied easily by varying this number. The cylinders are kept assembled and immersed near the water surface thanks to the ballast (9), which can also serve as a platform for the conversion package and for servicing.

The presented IHPES systems differ from each other by the topology of their conversion units, which are described hereafter.

Configuration 1: Electrically Interfaced IHPES System with Oil-Hydraulic Machine.

The schematic diagram of this configuration is given in FIG. 3-3. It is mainly characterized by:

The use of power electronics converters to interface the IHPES system to the power source. This allows associating different types of energy sources like wind and photovoltaic as can be seen on the figure. It also allows the use of existing windmills without any modification.

The use of an oil-hydraulic machine to indirectly drive the sea-water. Oil-hydraulic machines are much more common and provide higher efficiency compared to water-hydraulic machines, but they will require and interface between oil and water.

The AC electric power supplied by the generator (2) which is driven by the blades (1) is rectified by the converter (14). The DC power supplied by the PV panel (18) is shaped by the one-quadrant buck or boost converter (13) to fit the common DC bus voltage. These powers can then be either directly injected into the grid through the inverter (15) and the transformer (17), or stored in the IHPES system. The IHPES system's conversion chain composed of the frequency converter (16), the electrical machine (3), the oil-hydraulic machine (4) and the reciprocating cylinder (20) is completely reversible.

During storage, the converter (16) powers the electrical machine (3) that operates as a motor to drive the oil-hydraulic machine (4) in pump mode. This machine pumps the oil that circulates in closed-circuit through the small reservoir (26) and then alternatively in and out of the oil chambers ($21a$) and ($21b$) of the reciprocating cylinder (20). By switching alternatively between its positions "b" and "c", the 4-port 3-position distribution valve (12) transforms the continuous unidirectional oil-flow on the pump side into two alternating bidirectional oil-flows on the cylinder side.

The reciprocating piston cylinder (20) plays the role of power transmitter, pressure adapter and physical separator between the two active liquids. The alternating bidirectional flows of the driving oil into/from the oil-chambers ($21a$) and ($21b$) produces alternating left-right linear strokes of the single-body piston (24), which in turn induces alternating inflows and outflows of water from the water-chambers ($22a$) and ($22b$). To prevent the two liquids to mix up, their chambers are separated by two air-chambers ($23a$) and ($23b$) at atmospheric pressure. The alternating bidirectional water-flows on the cylinder side are transformed back into a continuous unidirectional flow on the accumulator side thanks to the second 4-port 3-position distribution valve (19) that operates in synchronisation with valve (12). The valve and the power converters are controlled by the command-and-control module (11). The sea-water (8) is cleaned by the filter (10) before being injected into the cylinder.

During the discharge, the process is simply reversed. The trapped-gas expands and expels from accumulators the water (7a, 7b, 7c . . . ), which becomes the driving liquid. The filter (10) is bypassed to avoid flow losses. The cylinder (20) and the valves (12) and (19) transform the water-flow into oil-flow which in turn drives the hydraulic machine in motor mode. The electrical machine therefore operates as a generator and the frequency converter (16) rectifies the generated AC power. The obtained DC power is transformed back by the inverter (15) into a fixed-frequency AC power to comply with the grid requirements.

Configuration 2: Electrically Interfaced IHPES System with Water-Hydraulic Machine.

Recent technological advancements in the field of materials have enhanced the development of efficient and cost-effective water-hydraulic machines. The main technical challenges, including leakage and erosion related to water's lower viscosity and higher specific gravity, have been solved in a cost-effective way. Modern water-hydraulic machine can be designed to operate with tap water as well as sea water.

With this perspective, the hydraulic circuit of configuration 1 can be simplified to obtain the second configuration presented in FIG. 3-4. The oil-hydraulic machine is replaced by a water-hydraulic machine; therefore the reciprocating cylinder is no more necessary. The lower efficiency of the water-hydraulic machine can be compensated by losses savings from the cylinder and valve elimination. In any case this simplification will yield lower cost and higher environmental compliance.

A possible geographical disposition of the two presented IHPES systems is given in FIG. 3-4. These configurations are suited for coast environment. The wind turbine is placed offshore and the PV panels onshore. The immersed storage unit is placed of course near the wind generator or in between the two sources. Given the higher line losses in hydraulic circuits compared to electrical lines, the hydraulic circuit should be shortened by placing the IHPES system's conversion chain that goes from the converter (3) to the filter (10), close to the storage unit; for instance above the platform (9). As for the power electronics, each converter is placed near its load or source and the common DC bus is then used to connect the different subsystems.

Configuration 3: Mechanically Interfaced IHPES System with Oil-Hydraulic Machine.

As it has been seen, one main advantage of the previous configurations is the possibility to associate two different kinds of energy sources with the same IHPES system. This is however done at the expense of a complex conversion that transforms the primary mechanical energy into electrical energy and back to mechanical energy before it can be stored. This multiple steps conversion will certainly affect the cost and efficiency of the overall system.

In case of offshore wind-only supply systems, it is possible to simplify the conversion chain by directly using the primary mechanical energy. Such a configuration is proposed in FIG. 3-5 where the wind turbine, the generator and the oil-hydraulic machine are mounted on the same shaft. The aim of this configuration is to generate an almost constant electric power. When the wind power is higher than the reference power, the excess power is used to pump the seawater into the accumulator through an oil-hydraulic system similar to that of configuration 1. When the wind power is lower than the reference power, the accumulators are discharged and the generated hydraulic power is used to compensate the missing wind power.

When the wind falls, the system can still generate electric power for a time that depends on the storage capacity. In that case, the blades are uncoupled from the main shaft to avoid useless mechanical charge, thanks to the clutch (4). The indirect power electronics conversion chain (13)-(14) allows complying with the constant frequency requirement of the line.

Configuration 4: Mechanically Interfaced IHPES System with Water-Hydraulic Machine.

The schematic diagram of Configuration 4 is given in FIG. 3-6. This configuration is similar to Configuration 3, except that it uses a water-hydraulic motor/pump that simplifies substantially the conversion chain as it has been seen for configuration 2.

Configuration 5: Hydraulically Interfaced IHPES System for Direct Wind-Hydraulic Power Generation.

The concept of Configuration 5 is different from the previous configurations in that the power transmission means is water. The schematic diagram of this Configuration is given in FIG. 3-7. The wind turbine directly drives the water-hydraulic pump (4) that pumps up seawater into the accumulators. For generation, the high pressure water drives the water-hydraulic motor (3) that in turn powers the generator to produce electrical energy. The system can be designed to use oil-hydraulic machines instead of water-hydraulic ones. In that case two reciprocating cylinders like those used in configurations 1 and 3 will be necessary for the water-to-oil interface; which will complicate the topology of the conversion system.

No reversible machine is necessary; therefore the whole system can operate at the same time. In that case, the accumulators simply play the role of power regulation like in classical hydraulic system. One advantage of this configuration is that mechanical constraints on the wind tower will be reduced substantially because hydraulic machines offer higher power densities compared to electrical machines.

The power electronics converters can be avoided in case a strictly constant power is not required. The electrical machine is therefore directly connected to the grid that imposes its speed and the generated power level will be imposed by the pressure and can vary slightly in a limited range.

From the original concept of closed gas cycle hydro-pneumatic storage system presented in FIG. 3-1, the invention proposes a new energy storage solution that particularly fits the water environment, for the onsite improvement of the power quality and availability of offshore and onshore electric power generation systems supplied by renewable sources such as wind and solar sources.

The proposed IHPES systems comprise of two main parts: an immersed/floating storage capacity and a conversion subsystem. This separation of the power part and the energy part offers more flexibility in designing and sizing the system.

The storage capacity is made of several gas-charged cylindrical accumulators that can be easily and cost-effectively realized from existing industrial products like oil and gas pipes. Its immersion allows, on one hand the reduction of the visual impact and space occupancy of its large volume and, on the other hand the improvement the thermodynamic efficiency through the larger heat exchange surface between the trapped gas and the surrounding water.

Many configurations of the conversion subsystem are possible, that can be classified in 3 categories depending on the mean of interfacing the storage system with the power sources:

The electrically interfaced IHPES systems. This category requires the use of many power electronics converter, but it allows the combination of different power sources like wind and photovoltaic in the same installation.

The mechanically interfaced IHPES systems. This category which is more suited for wind-only supplied system, directly exploits the primary mechanical energy of the windmill by coupling all the rotating machines on a single shaft. This results in a simpler conversion chain, higher efficiency and lower cost.

The hydraulically interfaced IHPES systems. This category firstly transforms the wind power into hydraulic power which is thereafter used to generate electric power. The accumulators can therefore directly play the role of power stabiliser.

In each category, it is possible to use either oil-hydraulic or water-hydraulic machines. Oil-hydraulic machines exhibit high conversion efficiency but they will require in that context a reciprocating cylinder for the water-to-oil interface. Water-hydraulic machines offer for the moment lower conversion efficiency than oil-hydraulic ones, but this can be compensated by the simpler conversion chain.

These various topologies and configurations offer a great flexibility and many possibilities of using this storage concept to fit the particular requirement of each offshore or onshore electric power generation installation.

GLOSSARY OF ABBREVIATIONS USED IN THE DESCRIPTION

MEPT: Maximum Efficiency Point Tracking
MPPT: Maximum Power Point Tracking
SC1: Static converter associated with the hydro-pneumatic accumulator
SC2: Static converter associated with AC or DC network
SC3: Static converter associated with the solar cells
SC4: Static converter associated with the supercapacitive accumulator
$U_{dc}$: Voltage of the DC bus
$\eta_{cell}$ Efficiency of MPPT mode in case of no dedicated converter (solutions 3Cvs and 2Cvs)
$p_{cell}$ Ratio of power extracted from the solar cell depending on the voltage across the supercapacitor tank
$\eta_1$ Efficiency of the converter SC1
$\eta_2$ Efficiency of the converter SC2
$\eta_3$ Efficiency of the converter SC3
$\eta_4$ Efficiency of the converter SC4
$\eta_s$ Efficiency of the charge mode
$\eta_d$ Efficiency of the discharge mode
$\eta$ Efficiency for one cycle, charge and discharge
$p_s$ Weighting factor—Energy transfer from the solar cells to the hydro-pneumatic accumulator
$p_d$ Weighting factor—Energy transfer from the hydro-pneumatic accumulator to the network
$\eta_{cap}$ Efficiency of the supercapacitive tank
$U_{cell}$ Voltage across the solar cells
$U_{MPPT}$ Voltage across the solar cells under MPPT conditions
$(U_{MPPT})_{max}$ Voltage across the solar cells under MPPT conditions for maximum sunning on the cells
$I_{cell}$ Current from the solar cells
$P_{cell}$ Power from the solar cells
$P_{MPPT}$ Power from the solar cells under strict MPPT conditions.
$(P_{cell})_{max}$ Power from the solar cells under MPPT condition
$W_{cell}$ Energy from the solar cells
$W_{MPPT}$ Energy from the solar cells under strict MPPT conditions.
$U_{scap}$ Voltage across the supercapacitive accumulator
$(U_{scap})_{min}$: Voltage across the supercapacitive accumulator
$(U_{scap})_{max}$ Voltage across the supercapacitive accumulator
$U_{max}$ Maximum voltage for one supercapacitor
$I_{scap}$ Current into the supercapacitive accumulator
$P_{scap}$ Charge/discharge power for the supercapacitive accumulator
$W_{scap}$ Energy stored into the supercapacitive accumulator
$P_{hydro}$ Charge/discharge power for the hydro-pneumatic accumulator
$W_{hydro}$ Energy stored into the hydro-pneumatic accumulator
$p_{rMAX}$ Maximum pressure into the tank of the hydro-pneumatic accumulator
$P_{MAX}$ Maximum feeding power for the hydropneumatic accumulator under $p_{rMAX}$
$t_{min}$ Minimum time allowed to store energy into the hydro-pneumatic accumulator under $P_{MAX}$
$W_u$ Energy requirements for sizing the supercapacitive tank.
N Number of supercapacitors.
$N_s$ Number of series connected supercapacitor in one branch.
$N_p$ Number of parallel branches of series connected supercapacitors.
d Voltage discharge ratio List of References - Section 1
[1] S. Lemofouet, Investigations and optimization of hybrid electricity storage systems based on compressed air and supercapacitors, Thesis Nmbr. 3628, EPFL, CH 1015 Lausanne, http://library.epfl.ch/theses/?nr=3628
[2] I. Cyphelly, A. Rufer, Ph. Briickmann, W. Menhardt, A. Reller, Usage of compressed air storage systems, Swiss Federal Office of Energy, DIS Project Nr. 100406, May 2004. Publ. Nr 240050, (enet@temas.ch).
[3] Kentschke T., "Druckluftmaschinen als Generatorantrieb in Warmluftspeichersystemen, PhD Dissertation, 2004, Technische Universität Clausthal, Germany
[4] John Sears, Thermal and Compressed-Air Energy Storage (TACAS), Next Energy Storage Storage Technology, ESA, Electricity Storage Association, Annual Meeting 2005, 24-26 May 2005, Proceedings, Toronto, Ontario, Canada.

List of References - Section 2

[1] S. Lemofouet, Investigations and optimization of hybrid electricity storage systems based on compressed air and supercapacitors, Thesis Nmbr. 3628, EPFL, CH 1015 Lausanne,
[2] P. Barrade, A. Rufer, *Current capability and power density of supercapacitors: considerations on energy efficiency*, EPE 2003: European Conference on Power Electronics and Applications, 2-4 September, Toulouse, France
[3] D. P. Hohm, M. E. Ropp, *Comparative study of maximum power point tracking algorithms*, Progress in photovoltaics: research and applications, Prog. Photovolt.: Res. Appl. 2003; 11:47-2 (DOI:10.1002/pip.459), Published by John Wiley & Sons, Ltd.

List of References - Section 3
[1] Zaugg, Hoffeins, *Brown Boveri air storage gas turbines*, Brown Boveri Review, Vol 64, number 1, January 19//
[2] Van der Linden Septimus, EESAT 02 Conference on Electrical Energy Applications and Technologies, San Francisco, April 2002

[3] A. Reller, I. Cyphelly; *Speicherung gasförmiger energienträger: Eine Bestandsaufnahme*, VDE—Berichte 1734, Energiespeicher, p.p. 37-45

[4] S. Lemofouet, Investigations and optimization of hybrid electricity storage systems based on compressed air and supercapacitors, thése EPFL No 3628, 2006

[5] Kentschke T., *Druckluftmaschinen als Generatorantrieb in Warmluftspeichersystemen*, PhD Dissertation, 2004, Technical University Clausthal, Germany.

[6] Hydro Oil & Energy; *Floating windmills*; Hydro media 54872/10.05. Oslo, Norway, www.hydro.com

The invention claimed is:

1. An energy storage device wherein energy from an array of solar cells is storable in a main storage, in particular a hydro-pneumatic storage or any other main energy storage means such as a battery or a flywheel, and in an auxiliary storage comprising an array of supercapacitors, wherein the main and auxiliary storages are alternately operable in first and second charging sequences, wherein in the first charging sequence the main storage is disconnected from the solar cells and the array of supercapacitors is charged from the array of solar cells, and in the second charging sequence the main storage is connected to be charged by the array of solar cells while the array of supercapacitors discharges, the main storage and auxiliary storages being connectable to an AC or DC network, characterized in that the array of solar cells is connected via the array of supercapacitors to the AC or DC network.

2. The energy storage device of claim 1 wherein the array of supercapacitors is connected to the AC or DC network, and to the main storage, directly or via a DC/DC converter.

3. The energy storage device of claim 1 wherein the supercapacitors are connected in parallel to the array of solar cells via a diode to prevent any reverse current into the solar cells.

4. The energy storage device of claim 3 wherein the voltage across the array of solar cells is defined by the voltage across the array of supercapacitors and wherein, according to the voltage/current characteristics of the solar cells for given sunning conditions, the response of the solar cells to the voltage defined by the supercapacitors is a current that circulates through the diode and that is distributed to the supercapacitors and to the main storage device depending on whether the storage devices are operating in the first or the second charging sequence.

5. The energy storage device of claim 1 wherein when the main storage is disconnected in the first charging sequence, the voltage across the supercapacitors increases and energy flows only from the solar cells to the supercapacitors.

6. The energy storage device of claim 1 wherein when the main storage is connected in the second charging sequence, the voltage across the supercapacitors decreases and energy fluxes from the solar cells and from the supercapacitors converge to the main storage.

7. The energy storage device of claim 1 wherein switching between the first and second charging sequences is triggered by monitoring the voltage across the supercapacitors.

8. The energy storage device of claim 7 wherein the first sequence is enabled when the voltage of the superconductors decreases below a minimum value $(U_{scap})_{min}$ and the second sequence is enabled when the when the voltage of the supercapacitors reaches a maximum value $(U_{scap})_{max}$.

9. The energy storage device of claim 8 wherein the variation of power extracted from the solar cells is defined by the range of voltage variation across the supercapacitors $(U_{scap})_{min}$ and $(U_{scap})_{max}$ as defined in claim 8.

10. The energy storage device of claim 8 wherein said minimum and maximum voltages $(U_{scap})_{min}$ and $(U_{scap})_{max}$ are adjusted in order to keep the solar cells near a Maximum Power Point Tracking condition (MPPT), in particular by setting $(U_{scap})_{max}$ to follow the solar cells voltage that defines the maximum of power delivered by the solar cells, as a function of sunning conditions, to define a system where the supercapacitors directly connected to the solar cells enable MPPT on the solar cells without an additional power converter.

* * * * *